(12) United States Patent
Chen

(10) Patent No.: US 10,867,580 B2
(45) Date of Patent: *Dec. 15, 2020

(54) THREE DIMENSIONAL (3-D) LOOK UP TABLE (LUT) USED FOR GAMUT MAPPING IN FLOATING POINT FORMAT

(71) Applicant: ATI TECHNOLOGIES ULC, Markham (CA)

(72) Inventor: Yuxin Chen, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,751

(22) Filed: Jan. 24, 2019

(65) Prior Publication Data

US 2019/0172418 A1 Jun. 6, 2019

Related U.S. Application Data

(63) Continuation of application No. 15/442,259, filed on Feb. 24, 2017, now Pat. No. 10,242,647.

(51) Int. Cl.
*G09G 5/06* (2006.01)
*G09G 5/04* (2006.01)
*G06F 3/14* (2006.01)
*G06T 11/00* (2006.01)
*H04N 1/60* (2006.01)

(52) U.S. Cl.
CPC ............. *G09G 5/06* (2013.01); *G06F 3/1407* (2013.01); *G06T 11/001* (2013.01); *G09G 5/04* (2013.01); *H04N 1/6019* (2013.01); *H04N 1/6061* (2013.01); *G09G 2320/0666* (2013.01); *G09G 2340/06* (2013.01)

(58) Field of Classification Search
CPC combination set(s) only.
See application file for complete search history.

(56) References Cited

U.S. PATENT DOCUMENTS

| 2015/0100612 | A1* | 4/2015 | Lee | G06F 7/38 |
| | | | | 708/209 |
| 2015/0179135 | A1* | 6/2015 | Stauder | H04N 1/6061 |
| | | | | 382/167 |
| 2016/0062954 | A1* | 3/2016 | Ruff | G06F 40/106 |
| | | | | 715/249 |

(Continued)

OTHER PUBLICATIONS

Final Office Action dated Feb. 21, 2019 for U.S. Appl. No. 15/469,299, 12 pages.

(Continued)

*Primary Examiner* — Wesner Sajous

(57) ABSTRACT

A data segmenter is configured to determine indices using numbers of most significant bits (MSBs) of fractional values of floating-point representations of component values of an input color that are selected based on exponent values of the floating-point representations. The component values are defined according to a source gamut. The data segmenter is also configured to determine offsets associated with the indices using subsets of the fractional values. An interpolator configured to map the input color to an output color defined according to a destination gamut based on a location in a three-dimensional (3-D) look up table (LUT) indicated by the indices and offsets.

20 Claims, 15 Drawing Sheets

(56) References Cited

U.S. PATENT DOCUMENTS

2016/0322024 A1* 11/2016 Stauder .................. G09G 5/06

OTHER PUBLICATIONS

Notice of Allowance dated May 15, 2019 for U.S. Appl. No. 15/388,663, 17 pages.
Notice of Allowance dated Jun. 19, 2019 for U.S. Appl. No. 15/469,299, 24 pages.

* cited by examiner

THREE DIMENSIONAL (3-D) LOOK UP TABLE (LUT) USED FOR GAMUT MAPPING IN FLOATING POINT FORMAT

The presentation application is a continuation application of U.S. patent application Ser. No. 15/442,259, entitled "A Three Dimensional (3-D) Look Up Table (LUT) Used for Gamut Mapping in Floating Point Format" and filed on Feb. 24, 2017, the entirety of which is incorporated by reference herein.

BACKGROUND

Display devices are used to view images produced by digital processing devices such as desktop computers, laptop computers, televisions, mobile phones, smart phones, tablet computers, digital cameras, and other devices. A wide variety of technologies including cathode-ray tubes (CRTs), liquid crystal displays (LCDs), plasma display panels, and organic light emitting diodes (OLEDs) are used to implement display devices. Consequently, different display devices are able to represent colors within different gamuts. As used herein, the term "gamut" refers to a complete subset of colors that can be accurately represented by a particular display device. The gamuts for two different display devices have the following three possible relationships: (1) gamut 1 is larger than gamut 2, e.g., some colors that can be displayed in device 1 cannot be displayed in device 2, (2) gamut 1 is smaller than gamut 2, e.g., all colors that can be displayed in device 1 can also be displayed in device 2, and (3) gamut 1 partially overlaps with gamut 2.

Furthermore, the same color, as perceived by the human eye, might be represented by different numerical values in different gamuts. For example, the RGB color system is commonly used in computer graphics to represent colors of pixels in images. The same color might be represented by different RGB values in different gamuts. Consequently, gamut mapping is used to map color values between different gamuts so that the perceived colors generated using the color values might be the same in different devices. However, the RGB color system is not perceptually linear so that changes in the colors perceived by the human visual system are not proportional to changes in the RGB values. Other commonly used color systems including the HLS, HSV, and YIQ color systems are also perceptually non-linear. At least in part because of the perceptual nonlinearity of color systems, gamut mapping is difficult to perform in perceptually nonlinear color systems.

Gamut mapping is more straightforward in color systems that are perceptually uniform. As used herein, the phrase "perceptually uniform" refers to a color system in which uniform changes in the components of the color space defined by the color system correspond to uniform changes in perceived color. Relative perceptual differences between colors in a perceptually uniform color system are approximated by treating each color as a point in a three-dimensional (3-D) space and taking the Euclidean distance between the points that represent the two colors. For example, the CIELAB color system is almost perceptually uniform. There are other advanced color systems, such as CIECAM02, which are even more perceptually uniform than CIELAB. Gamut mapping of perceptually non-linear color systems (such as RGB) can therefore be performed by transforming the color values from the perceptually nonlinear color system to a perceptually uniform color system (such as CIELAB) and then performing gamut mapping in the perceptually uniform color system. Gamut mapped values of the pixels are then transformed from the perceptually uniform color system back to the perceptually nonlinear color system (such as RGB). Gamut mapping by transformation into perceptually uniform color systems therefore incurs significant computational overhead.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
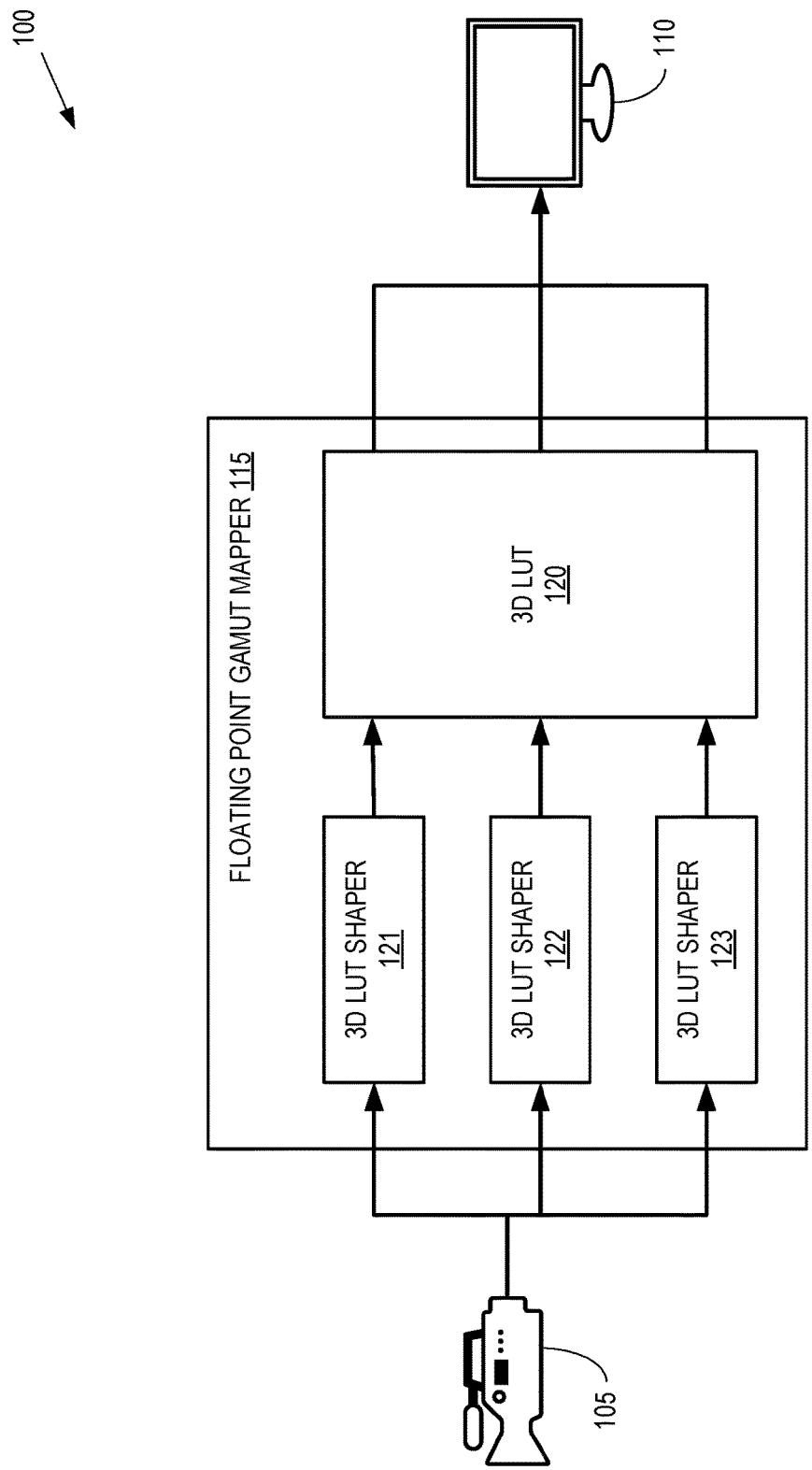
FIG. 1 is a block diagram of an image acquisition and display system according to some embodiments.

The color mapping between two gamuts is conventionally performed using a 3-D look up table (LUT). For example, the three dimensions in the 3-D LUT correspond to the R, G, and B values that represent a pixel color in a source gamut and vertices in the 3-D LUT are associated with the RGB values that represent the same pixel color in a destination gamut. Interpolation is used to compute color component values in the destination gamut for arbitrary RGB values in the source gamut. For example, trilinear or tetrahedral interpolation can be used to compute color component values for an input RGB value based on the color component values of vertices that define a volume that bounds the input RGB value in a corresponding cube or tetrahedron. The color component values in a conventional 3-D LUT are represented by a set of bits in a fixed point format. For example, color component values ranging from 0 . . . 255 are represented by a set of eight bits in a fixed point format. An address decoder of a conventional 3-D LUT uses a subset of the most significant bits (MSBs) of the fixed point format of the input RGB value to identify a corresponding vertex in the 3-D LUT. Consequently, the number of samples along each of the three dimensions of the 3-D LUT are constrained to $(2^m+1)$, where m is the number of MSBs used by the address decoder to identify the vertices in the 3-D LUT.

The dynamic range of a fixed point format of a component color value is smaller than the dynamic range that can be represented by a floating-point component color value. Floating-point formats of component color values can therefore be used to represent higher dynamic ranges than fixed point formats. Consequently, floating-point formats may be preferable for representing color component values in some displays such as high dynamic range (HDR) displays. Although the floating-point format provides higher dynamic range, a conventional address decoder cannot use the bits in the floating-point representation of the color component value to identify the vertices in the 3-D LUT. Consequently, a conventional 3-D LUT implementation cannot be used to perform gamut mapping between input color component values in a source gamut and output color component values in a destination gamut when the input color component values are represented in a floating-point format.

At least in part to address these drawbacks in the conventional practice, a data segmenter is introduced to identify a vertex in a 3-D LUT that is used to interpolate from an input color in a source gamut to an output color in a destination gamut based on component values of the input color represented in a floating-point format. For each component value of the input color, e.g., values of the Red, Green, and Blue components of the input color, the data segmenter identifies a sample along a corresponding axis of the 3-D LUT based on an exponent value of the floating-point representation of the component value and a selected number of most significant bits (MSBs) of a fractional value of the floating-point representation of the component value. The number of MSBs selected from the fractional value, which includes a total of F bits, is determined based on the exponent value. In some embodiments, the floating point representation includes one implicit bit, which is implicitly padded to the left side of the fractional value. The selected number of MSBs are padded with one or more additional bits and the padded MSBs are provided to an address decoder, which uses the padded MSBs to identify the sample along the corresponding axis of the 3-D LUT. The samples that are identified along the three axes of the 3-D LUT using the corresponding component values of the input color define a vertex of a cube that encompasses a location of the input color. An offset from the vertex along each axis is determined by setting the selected number of MSBs in the floating-point representation of the corresponding component value to zero and then left-shifting bits in the fractional value until the implicit bit of the fractional value is equal to 1. The exponent value is decreased by one for each left-shift of the bits in the fractional value. The resulting offsets along each axis are provided to the address decoder, which uses the offsets to identify additional vertices of the cube that are used to interpolate from values of the color components associated with the vertices of the cube to component values of an output color at the location of the input color in the 3-D LUT.

FIG. 1 is a block diagram of an image acquisition and display system 100 according to some embodiments. The image acquisition and display system 100 includes an image acquisition device 105 that acquires or generates images for display on a display 110. Some embodiments of the image acquisition device 105 are cameras that acquire images (including video images in some cases) of a scene in a digital format. Other embodiments of the image acquisition device 105 are processing systems that are able to generate images (including video images in some cases) for presentation on the display 110. For example, the image acquisition device 105 can include a graphics processing system such as a gaming system that generates images for presentation on the display 110.

The images that are acquired or generated by the image acquisition device 105 are represented by values of pixels. The pixel values are numbers that indicate colors produced by the pixels according to a color system that defines a gamut of colors. For example, the pixel values can include three numbers that indicate Red, Green, and Blue components of the color produced by each pixel. The numbers that represent the pixel values are encoded in a floating-point format. The display 110 uses the pixel values to determine the color that is generated by each pixel to produce the image that is displayed on the display 110. The display 110 interprets the pixel values in terms of a gamut implemented by the display 110. However, as discussed herein, the gamut used by the image acquisition device 105 to acquire/generate images is not necessarily the same as the gamut used by the display 110 to present the images to a user. Furthermore, different displays can implement different gamuts.

A floating point format can be used to represent numbers of different orders of magnitude with a fixed number of digits. The numerical value of a finite number is $v=(-1)^{sign} \times (significand) \times (base)^{exponent}$. For base 2, when the most significant bit (MSB) of the significand is always 1 and the radix point is assumed to be between the MSB and the second MSB of the significand, the significand is called normalized significand. In some embodiments, the pixel values are encoded in a floating-point format that represents each color component value with a sign bit (s), a set of exponent bits (e), and a set of fraction bits (f). If the floating-point format with base 2 includes a number (S) of sign bits, a number (E) of exponent bits, and a number (F) of fraction bits, the value (v) of a color component is represented as:

$$v = \begin{cases} NaN & if\ e = 2^E - 1, f \neq 0 \\ (-1)^s \times \infty & if\ e = 2^E - 1, f = 0 \\ (-1)^s \times (1 \cdot f) \times 2^{e+1-2^{E-1}} & if\ 0 < e < 2^E - 1 \\ (-1)^s \times (0 \cdot f) \times 2^{2-2^{E-1}} & if\ e = 0, f \neq 0 \\ (-1)^s \times 0 & if\ e = 0, f = 0 \end{cases}$$

For example, if S=1, E=5, F=12, the definition of pixel values in the floating-point format is:

$$v = \begin{cases} NaN & \text{if } e = 31, f \neq 0 \\ (-1)^s \times \infty & \text{if } e = 31, f = 0 \\ (-1)^s \times (1 \cdot f) \times 2^{e-15} & \text{if } 0 < e < 31 \\ (-1)^s \times (0 \cdot f) \times 2^{-14} & \text{if } e = 0, f \neq 0 \\ (-1)^s \times 0 & \text{if } e = 0, f = 0 \end{cases}$$

In above equations, the significand could be either 1.f or 0.f, that is, either normalized or denormalized significand, depending on the value of e and f. The MSB of the significand can be hidden to save hardware resource and therefore referred to as an implicit bit. That is, this leading bit 1 or 0 of the significand need not be represented in the memory string encoding. The floating-point format used in the following discussion is represented in base 2, which can be advantageous for implementing embodiments of the techniques disclosed herein and hardware. However, other embodiments of the floating-point format can be represented in other bases. Furthermore, other embodiments of floating-point formats can be implemented according to other technical standards, such as the IEEE 754 Standard for floating-Point Arithmetic.

The image acquisition and display system 100 includes a floating-point gamut mapper 115 to map pixel values produced by the image acquisition device 105 according to a first gamut to pixel values used by the display 110 to present images to a user according to a second gamut. The floating-point gamut mapper 115 includes (or has access to) a 3-D LUT 120 that stores samples of color values in the second gamut corresponding to color values in the first gamut. The 3-D LUT 120 is represented as a lattice having three dimensions that correspond to three color components in the first gamut. For example, the 3-D LUT 120 can be represented as a lattice having a first dimension corresponding to the Red color component, a second dimension corresponding to the Green color component, and a third dimension corresponding to the Blue color component. Each vertex in the 3-D LUT 120 is associated with a sample of color values in the second gamut that correspond to the color values in the first gamut. For example, the color component values $(R_1, G_1, B_1)$ in the first gamut map to a vertex in a lattice of the 3-D LUT 120 that is associated with corresponding color component values $(R_2, G_2, B_2)$ in the second gamut.

In some embodiments, the number of samples along each of the three dimensions of the 3-D LUT 120 is equal to $(2^m+1)$, where m is a number of bits in a fixed point representation of a number that is used to identify the vertices in the 3-D LUT 120. For example, the color component values of an input color in the 3-D LUT 120 can be encoded in a fixed point format so that the m MSBs of a fixed point representation of a color component can be used to identify the vertices in the 3-D LUT 120. However, other embodiments of the 3-D LUT 120 can implement flexible addressing of different numbers of samples along the axes of the 3-D LUT 120. An example of flexible addressing is disclosed in U.S. patent application Ser. No. 15/388,663, entitled "FLEXIBLE ADDRESSING FOR A THREE DIMENSIONAL (3-D) LOOK UP TABLE (LUT) USED FOR GAMUT MAPPING," which was filed Dec. 22, 2016 and which is incorporated herein by reference in its entirety.

The color component values of the input color are provided to the floating-point gamut mapper 115 in a floating-point format. The floating-point gamut mapper 115 is therefore configured to convert floating-point representations of component values of the input color to fixed point indices of the component values of the input color and corresponding offsets. The floating-point gamut mapper 115 can identify vertices in the 3-D LUT 120 that define a cube or tetrahedron that encompasses a location in the 3-D LUT 120 indicated by the fixed point representation of the indices for the component values of the input color. The floating-point gamut mapper 115 is further configured to map the input color to an output color defined according to a destination gamut based on the location in the 3-D LUT 120, e.g., using trilinear or tetrahedral interpolation.

Sampling of the 3-D LUT 120 and interpolation based on the sampled values are linear processing techniques, whereas human perception is nonlinear, e.g., the human eye is more sensitive to relative differences between darker tones and lighter tones. Shaping of the input values of the color components is therefore used to account for the nonlinearity of human perception. In the illustrated embodiment, the gamut mapper 115 includes 3-D LUT shapers 121, 122, 123 (collectively referred to herein as "the 3-D LUT shapers 121-123") that perform shaping of the values of the input color components. For example, the 3-D LUT shaper 121 shapes the value of the Red component, the 3-D LUT shaper 122 shapes the value of the Green component, and the 3-D LUT shaper 123 shapes the value of the Blue component.

Figure 2:
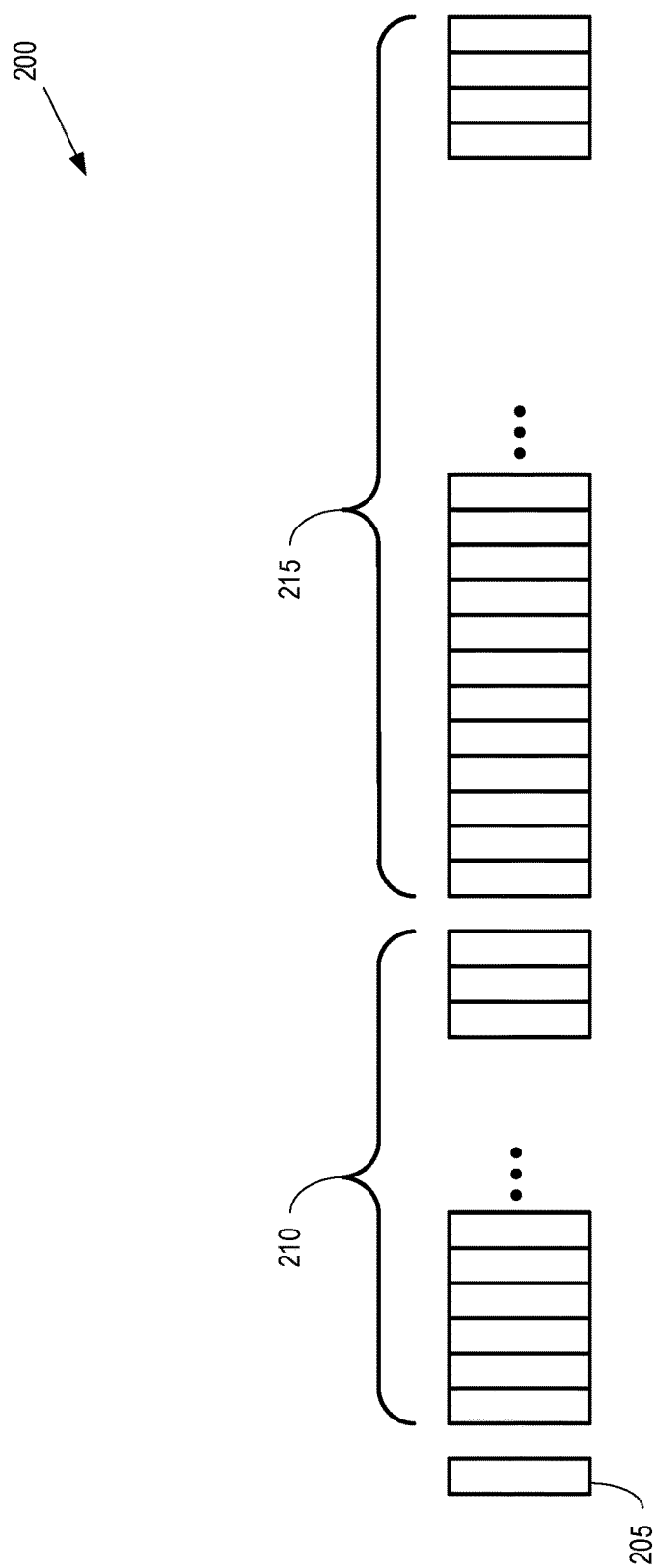
FIG. 2 is a diagram that illustrates a floating-point representation of a color component value according to some embodiments.

FIG. 2 is a diagram that illustrates a floating-point representation 200 of a color component value according to some embodiments. The floating-point representation 200 includes one or more bits 205 that represent a sign of the color component value, a set of bits 210 that represent an exponent value of the color component value, and a set of bits 215 that represent a fractional value of the color component value. For example, the one or more bits 205 can include a single sign bit, the set of bits 210 can include five bits to represent the exponent value, and the set of bits 215 can include 12 bits to represent the fractional value of the color component.

Figure 3:
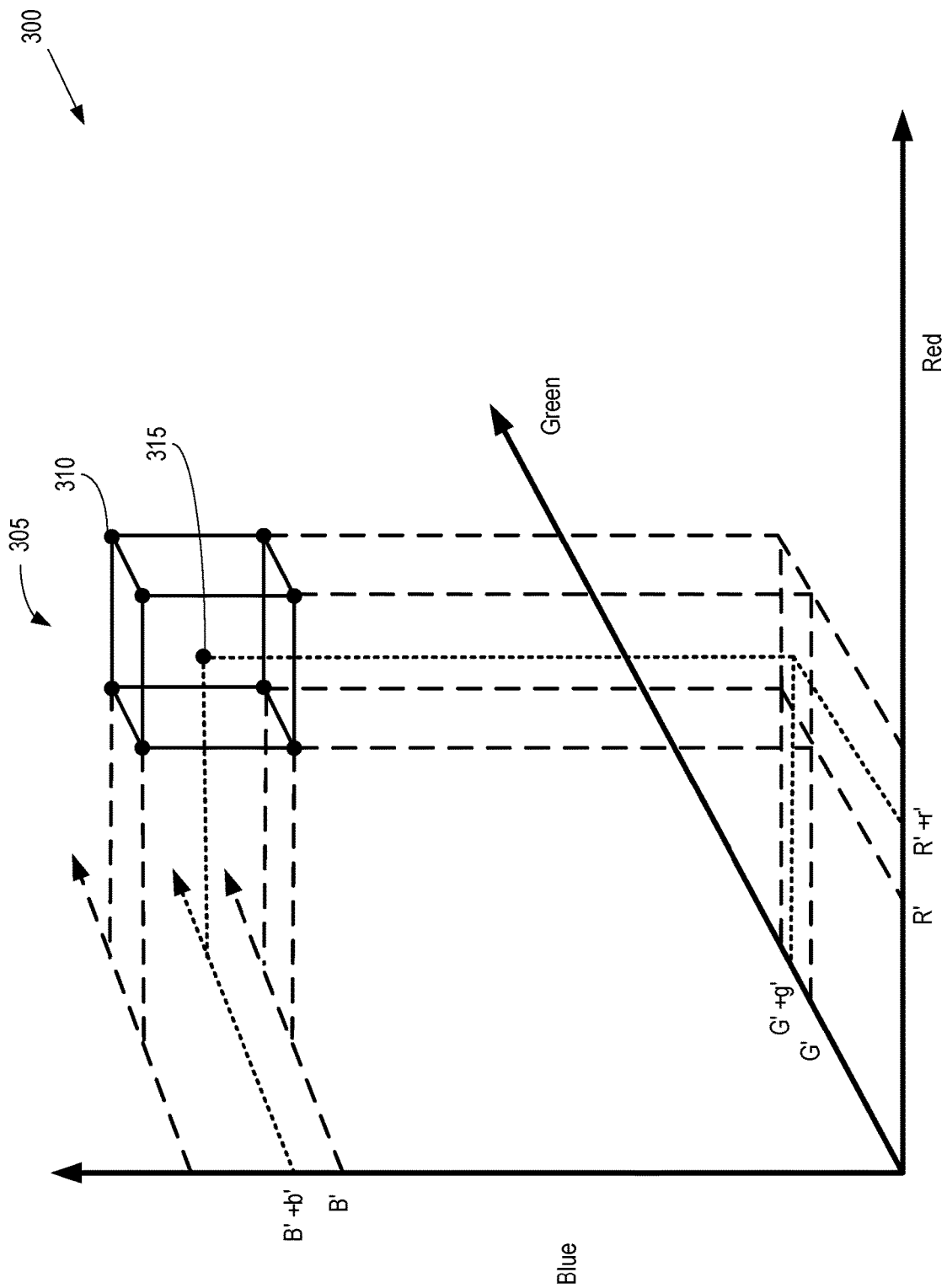
FIG. 3 is a diagram of a portion of a lattice that represents a 3-D LUT according to some embodiments.

FIG. 3 is a diagram of a portion 300 of a lattice that represents a 3-D LUT according to some embodiments. In the interest of clarity, a single cube 305 from the lattice is shown in the portion 300. The cube 305 is defined by a set of vertices 310 (only one indicated by a reference numeral in the interest of clarity) in the lattice. Each vertex 310 is addressed or identified by color component values in a first gamut. For example, the portion 300 of the lattice is defined in an RGB color space so that the three axes of the 3-D LUT correspond to the Red, Green, and Blue color components. The vertex 310 is then identified based on the color component values (R', G', B'). As discussed herein, the color component values (R', G', B') are represented in a fixed point format in the 3-D LUT, e.g., the color component values at the sample locations are equal to a fixed point value indicated by a number (m) of MSBs of the color component value corresponding to the vertex 310. Color component values of input colors that are represented in floating-point format are therefore converted to a fixed point format that can be used to identify the vertices 310. For example, the floating-point color component values can be used to generate fixed point values of indices that are used to identify the vertex 310, as discussed herein.

Each of the vertices 310 is associated with mapped color component values in a second gamut. The color component values associated with the vertices 310 can therefore be used to map input colors in the first gamut to output colors in the second gamut by interpolating from the color component values associated with the vertices 310 to locations indicated by the input color in the first gamut. In some embodiments, tetrahedral interpolation is used to determine an output color by interpolating from four of the vertices 310 to the location of the input color. For example, values of the color components in the second gamut associated with four of the vertices 310 can be interpolated to a location 315 in the cube 305 of the lattice that represents the 3-D LUT. The location 315 is indicated by the color components (R'+r', G'+g', B'+b') of the input color of the first gamut. In a conventional 3-D LUT, the color component values (r', g', b') are equal to the remaining least significant bits (LSBs) of the input color in the first gamut. However, since the input colors are represented in a floating-point format, the color component values (r', g', b') are determined by an offset relative to the vertices 310 that is determined based on the floating-point representation of the color component values, as discussed herein.

Figure 4:
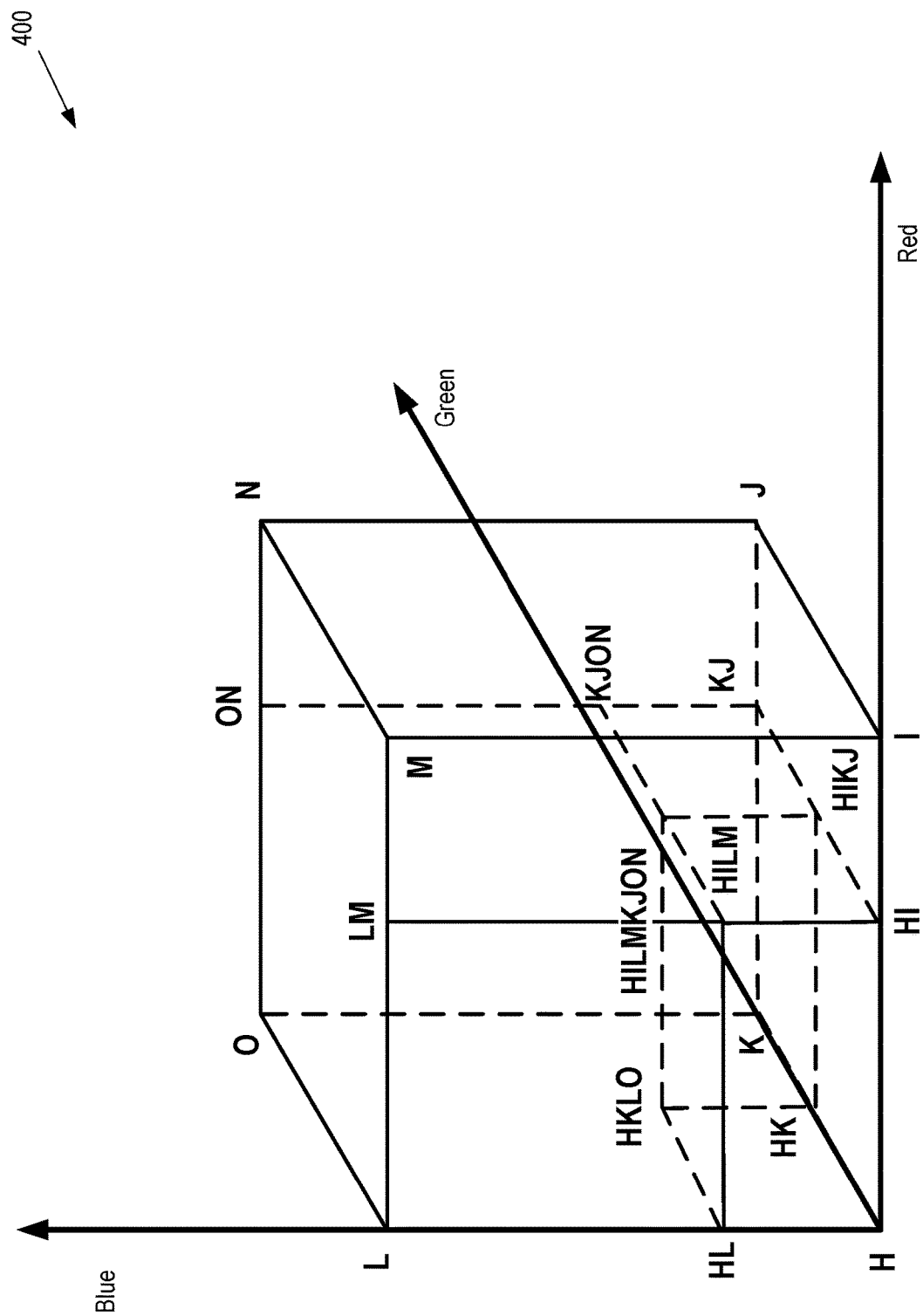
FIG. 4 is a diagram of a cube that encompasses a location in a 3-D LUT indicated by a floating-point representation of color component values of an input color according to some embodiments.

FIG. 4 is a diagram of a cube 400 that encompasses a location in a 3-D LUT indicated by a floating-point representation of color component values of an input color according to some embodiments. The cube 400 represents some embodiments of the cube 305 shown in FIG. 3. The vertices of the cube 400 are indicated by the letters (H, I, J, K, L, M, N, O) and the location in the 3-D LUT indicated by the floating-point representation of the color component values of the input color is indicated by HILMKJNO. The volume of the cube 400 is V and the volume of a sub-cube defined by the vertices H, HI, HL, HILM, HK, HKLO, HIKJ, HILMKJON is VN, where the subscript N indicates that the sub-cube is directly opposite the vertex N.

The interpolated output color can be represented as:

$$RGB_{out} = \frac{\sum_{i=H}^{O} V_i \times RGB_i}{V}$$

where $RGB_i$ are the mapped color component values for the input color components associated with the vertices (i) and $RGB_{out}$ are the interpolated outputs for the location HILMKJNO. In some cases, this equation can be simplified to obtain trilinear interpolation equations along the three axes: Red, Green, and Blue. For example, the interpolation along the Red axis for point HI can be obtained by using information at the vertices H and I, the interpolation for point KJ can be obtained using information at the vertices J and K, and so on. The interpolation along the Green axis is used to obtain values at the location HILM by using values at the locations HI and LM, the interpolation for the point KJON is obtained using values that the locations KJ and ON, and so on. The interpolation along the Blue axis is used to obtain values at the location HILMKJON by using values at the locations HILM and KJON. Therefore, the interpolation requires 14 multiplications in three cascaded steps. In each step the bit width is accumulated and carried over to the next steps to preserve precision of the calculation. The resulting bit width of the multiplicand can therefore be relatively large.

Figure 5:
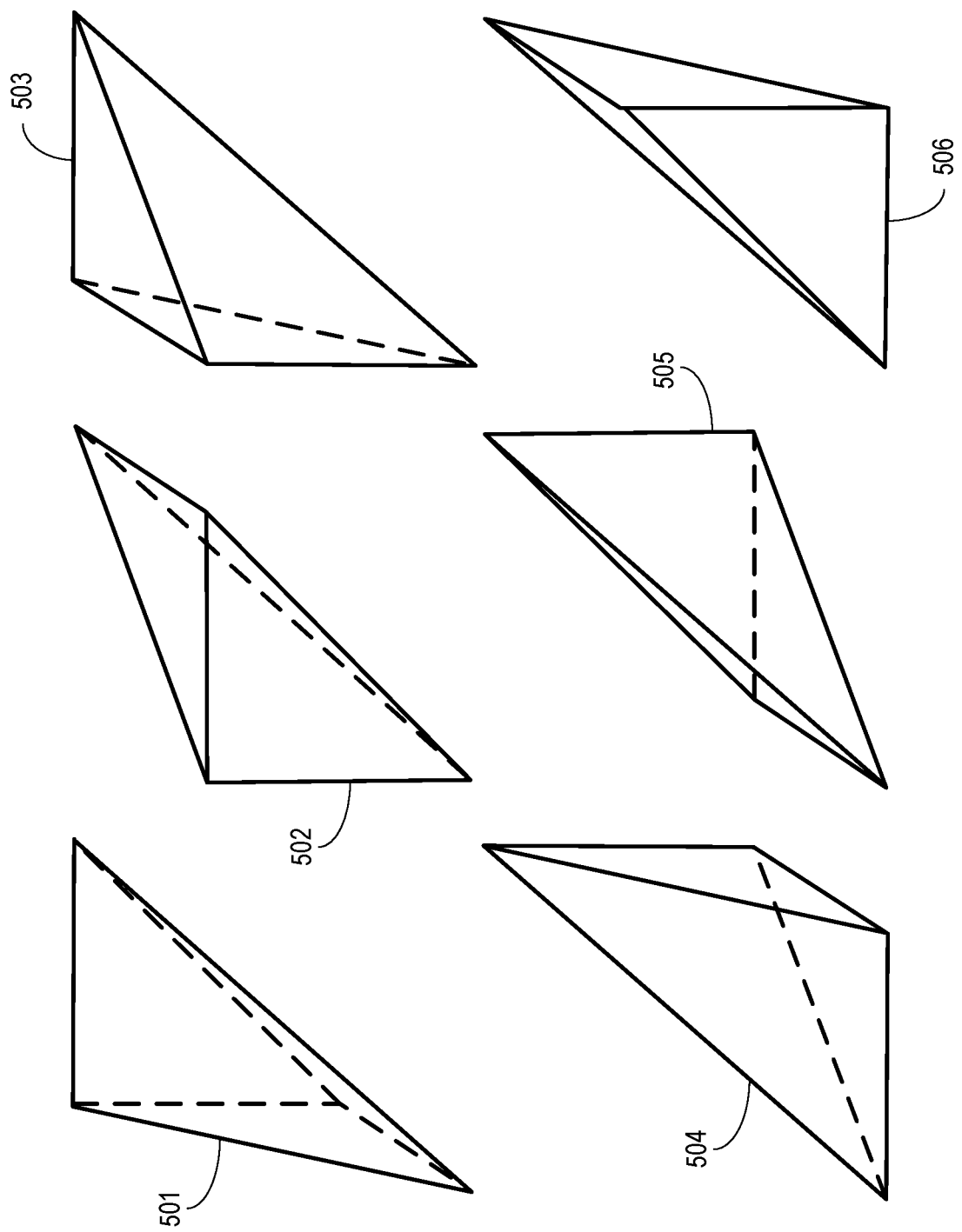
FIG. 5 is a diagram illustrating decomposition of a single cube into six tetrahedrons according to some embodiments.

FIG. 5 is a diagram illustrating decomposition of a single cube into six tetrahedrons 501, 502, 503, 504, 505, 506 according to some embodiments. The six tetrahedrons 501-506 represent some embodiments of the cube 305 shown in FIG. 3. One of the six tetrahedrons 501-506 is selected to perform tetrahedral interpolation based on the location indicated by the floating-point representation of the color component values of the input color. For example, the tetrahedron 501 is selected if the location indicated by the component values of the input color falls within the tetrahedron 501. The values of the color components in the second gamut are then interpolated from the four vertices of the selected one of the six tetrahedrons 501-506 to the location indicated by the color component values of the input color (in the first gamut) to determine the value of the output color.

Figure 6:
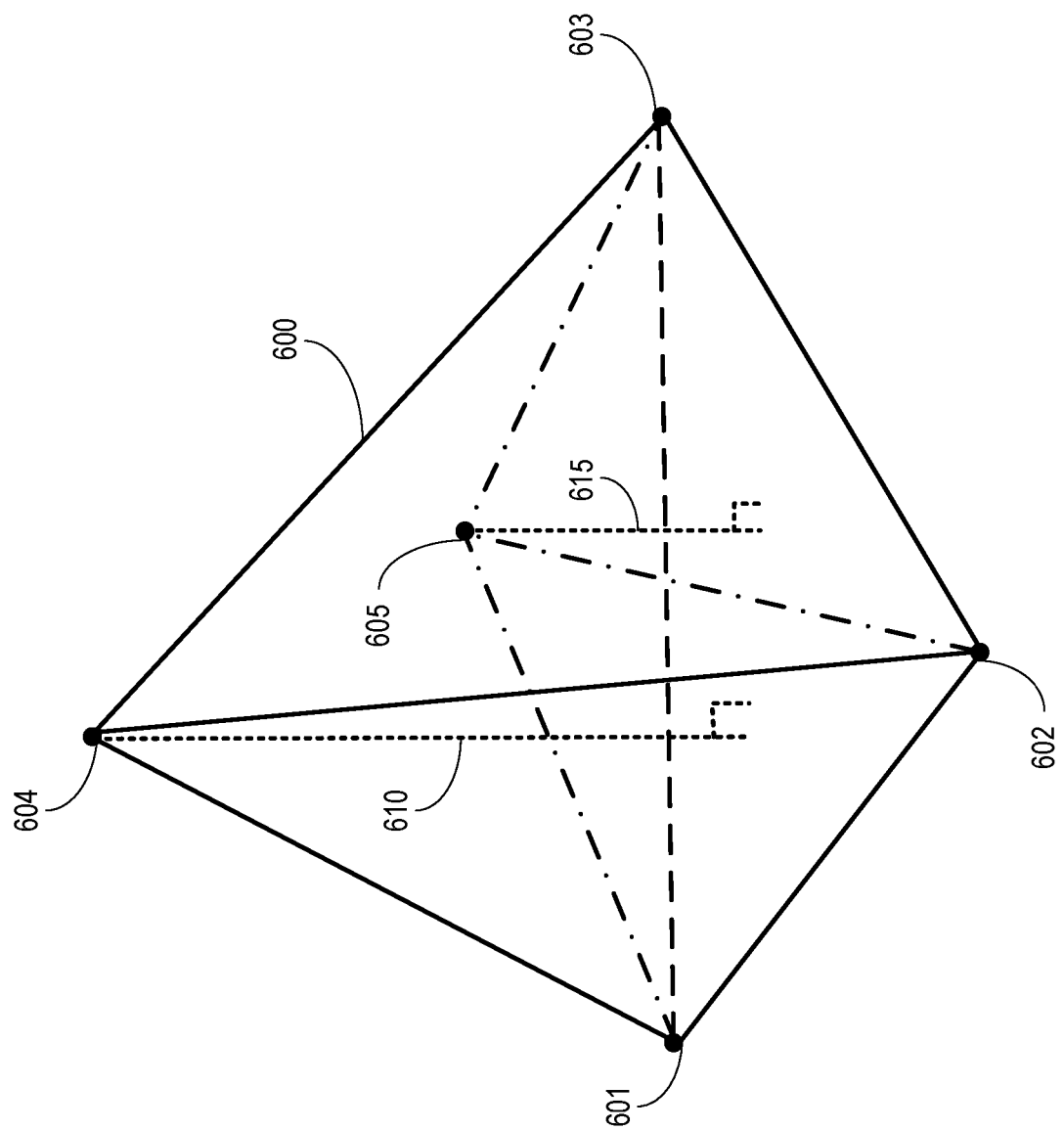
FIG. 6 is a diagram of a tetrahedron used for tetrahedral interpolation according to some embodiments.

FIG. 6 is a diagram of a tetrahedron 600 used for tetrahedral interpolation according to some embodiments. Some embodiments of the tetrahedron 600 represent a selected one of six tetrahedrons that, in combination, represent the cube in the 3-D LUT. For example, the tetrahedron 600 can represent a selected one of the tetrahedrons 501-506 shown in FIG. 5. The tetrahedron 600 has four vertices 601, 602, 603, 604 (collectively referred to herein as "the vertices 601-604") that correspond to vertices in the 3-D LUT. The vertices 601-604 are identified based on a value indicated by indices that are determined based on the floating-point representation of the color component values. For example, as discussed herein, a selected number of bits of the fractional value of the floating-point representation of the color component value can be padded to form an index having a number (m) of bits corresponding to the MSBs of a fixed point representation of the color component values in a first gamut, as discussed herein. Each of the vertices 601-604 is associated with color component values in a second gamut. The vertices 601-604 can also be referred to as the vertices A, B, C, D and the associated color component values in the second gamut can be referred to as $O_A$, $O_B$, $O_C$, $O_D$, respectively.

The interpolated output value for an input color that maps to the input point 605 (also referred to as the input point I) is given by:

$$O_I = \frac{1}{V}(V_A \times O_A + V_B \times O_B + V_C \times O_C + V_D \times O_D)$$

where V is the volume of the tetrahedron 600 and $V_i$ (i=A, B, C, D) is the volume for a sub-tetrahedron. For example, $V_D$ is the volume for a sub-tetrahedron bounded by the vertices IABC. The volumes $V_D$ and V share the same bottom surface ABC, and so the above equation can be rewritten as:

$$O_I = \frac{h_A}{H_A} \times O_A + \frac{h_B}{H_B} \times O_B + \frac{h_C}{H_C} \times O_C + \frac{h_D}{H_D} \times O_D$$

where $H_i$(i=A, B, C, D) is the height of the volume V from vertices i respectively and $h_i$(i=A, B, C, D) is the height of the volume $V_i$ from input point I. For example, the height 610 is equivalent to $H_D$ and the height 615 is equivalent to $h_D$. Output weights for corresponding i, (i=A, B, C, D) are defined as:

$$w_i = \frac{h_i \times \Delta}{H_i}$$

where $\Delta$ is the length of a side of the cube. The output value $O_1$ can then be written as:

$$O_I = (W_A \times O_A + W_B \times O_B + W_C \times O_C + W_D \times O_D)/\Delta$$

Figure 7:
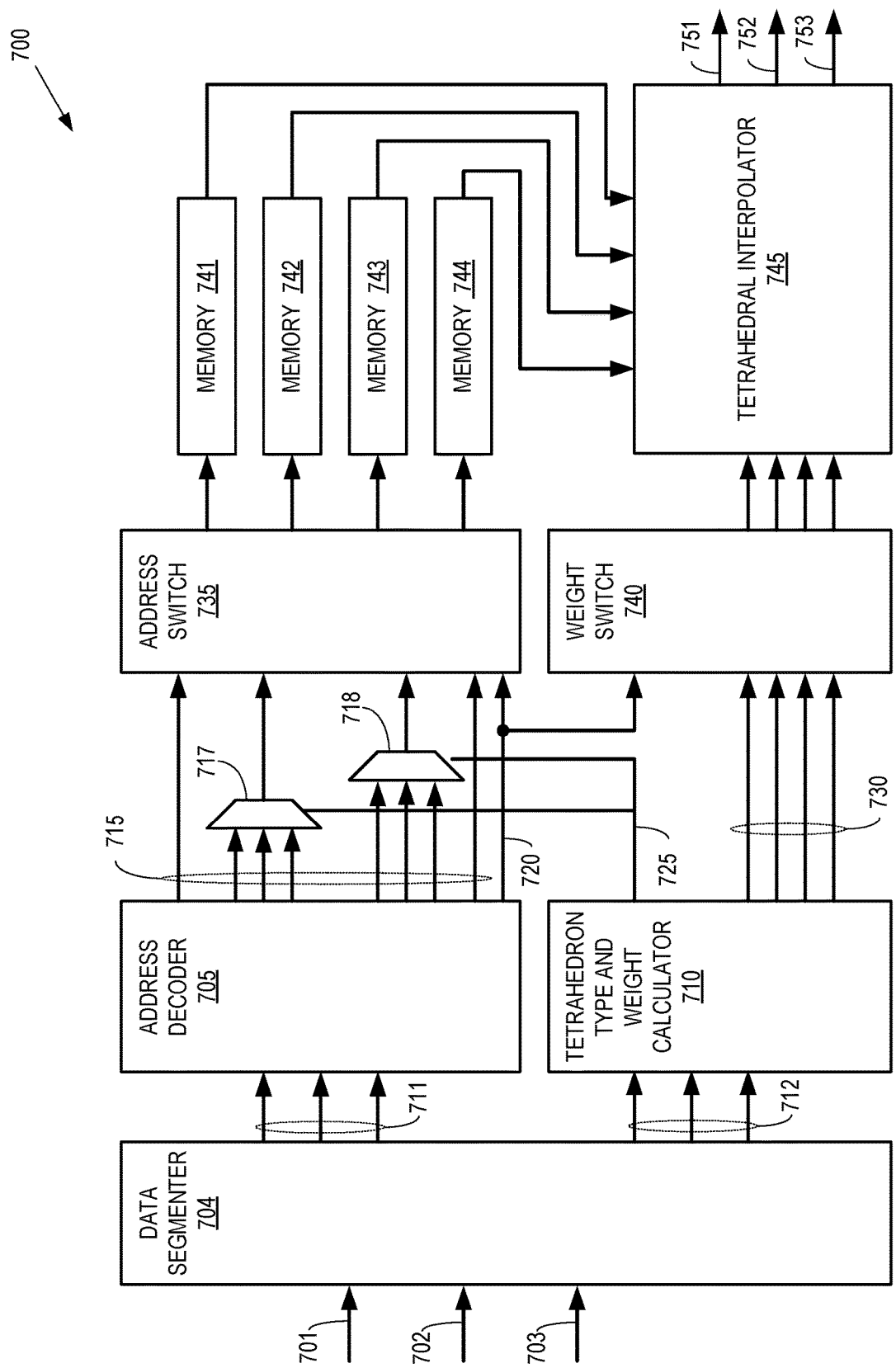
FIG. 7 is a block diagram of a 3-D LUT according to some embodiments.

FIG. 7 is a block diagram of a 3-D LUT 700 according to some embodiments. The 3-D LUT 700 is used to implement some embodiments of the 3-D LUT 120 shown in FIG. 1. The illustrated embodiment of the 3-D LUT 700 is implemented using a linear spacing of samples along each axis of the 3-D LUT, e.g., the Red, Green, and Blue axes in the portion 300 of the 3-D LUT illustrated in FIG. 3. Thus, a number (m) of bits are used to represent $2^m+1$ samples along the axes of the 3-D LUT 700. However, other embodiments of the 3-D LUT 700 can implement flexible addressing of different numbers of samples along the axes of the 3-D LUT 700, as discussed herein.

The 3-D LUT 700 receives input information representative of values of the color components of an input color in a first gamut. The input data includes floating-point representations of the color components $R_{in}$, $G_{in}$, $B_{in}$, which are received on the input lines 701, 702, 703, collectively referred to herein as "the input lines 701-703." In the illustrated embodiment, the 3-D LUT 700 is configured to perform tetrahedral interpolation. However, other embodiments can be configured to perform trilinear interpolation, as discussed herein.

The floating-point representations received on the input lines 701-703 are provided to a data segmenter 704 that converts the floating-point representations of the component values of the input color to fixed point representations of indices of the component values of the input color and corresponding offsets. Some embodiments of the data segmenter 704 determine the indices using numbers of most significant bits (MSBs) of fractional values and the exponent values of the floating-point representations of the component values of the input color. The numbers of MSBs are selected based on exponent values of the floating-point representations. The indices can then be left padded with one or more bits so that the indices are all represented by a number (m) of bits that is the same as the number (m) of bits that are used to represent samples along the axes of the 3-D LUT 700. The data segmenter 704 can also determine offsets associated with the indices using subsets of the fractional values that do not include the MSBs selected from the fractional value based on the exponent values, as discussed herein.

The m-bit values 711 of the indices for each of the color components $R_{in}$, $G_{in}$, $B_{in}$ are provided to an address decoder 705 and values 712 of the offsets for each of the color components $R_{in}$, $G_{in}$, $B_{in}$ are provided to a module 710 that determines a type of tetrahedron used for interpolation and calculates weights for the interpolation, as discussed herein. The address decoder 705 generates signals 715 that indicate the vertices of a cube that bound a location of the input color and a subset of the signals 715 are provided to multiplexers 717, 718. The address decoder 705 also generates a signal 720 representative of a type of the 3-D LUT, as discussed herein.

The module 710 generates selection signals 725 that are provided to the multiplexers 717, 718 to select the output of the multiplexers 717, 718. The selection signal 725 is determined based on a type of tetrahedron used for interpolation. The module 710 also generates weights 730 that correspond to the type of tetrahedron used for the interpolation.

Signals generated by the address decoder 705 and the multiplexers 717, 718 are provided to an address switch 735 that performs address switching as disclosed herein. Addresses determined by the address switch 735 are used to identify memory locations in the memories 741, 742, 743, 744, which are collectively referred to herein as "the memories 741-744." Values of color components in the second gamut that are associated with the vertices in the 3-D LUT are stored in the memories 741-744. The color component values can be distributed among the memories 741-744 so that interpolation can be performed using values that are retrieved concurrently from the memories 741-744. The signal 720 is also provided to a weight switch 740, which also receives the signals (weights) 730 generated by the module 710. The weight switch 740 performs weight switching as disclosed herein. Signals representative of weights generated by the weight switch 740 are provided to a tetrahedral interpolator 745, which also receives color component values of the vertices of a tetrahedron from the memories 741-744. The tetrahedral interpolator 745 uses the weights and the color component values to generate an output value by tetrahedral interpolation. The output color component values are provided on the lines 751, 752, 753.

Figure 8:
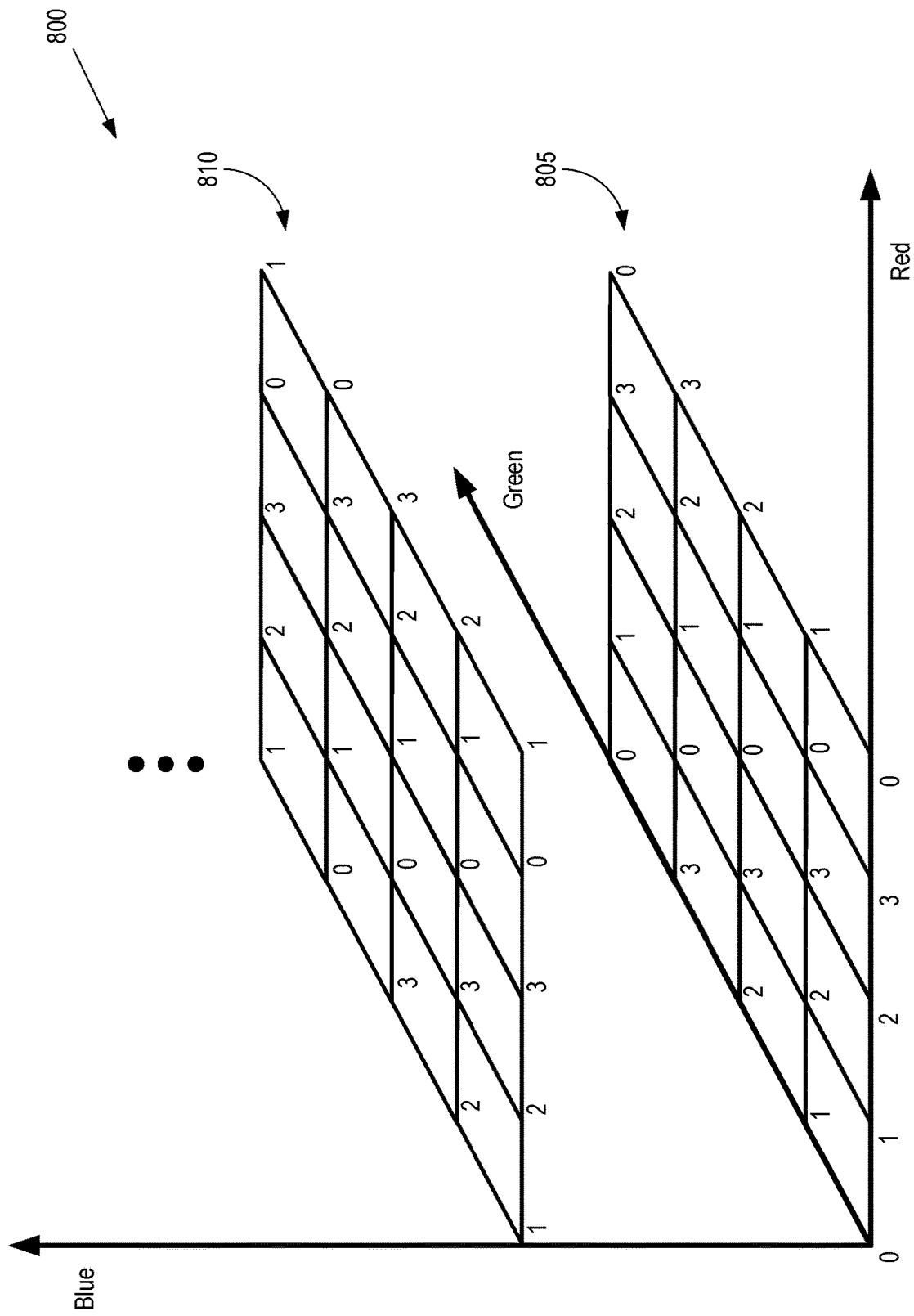
FIG. 8 is a diagram illustrating mapping of vertices of a 3-D LUT to a set of memories according to some embodiments.

FIG. 8 is a diagram illustrating mapping of vertices of a 3-D LUT 800 to a set of memories according to some embodiments. The 3-D LUT 800 corresponds to some embodiments of the 3-D LUT 120 shown in FIG. 1 and the portion 300 of the 3-D LUT shown in FIG. 3. The three component colors in the 3-D LUT 800 are Red, Green, and Blue, which correspond to the axes of the 3-D LUT 800. Input colors in a first gamut can therefore be mapped to locations in the 3-D LUT 800 based on the floating-point values of their component colors, as discussed herein. The 3-D LUT 800 includes layers 805, 810 of vertices that correspond to different values of the color components in the Blue dimension. Each vertex is associated with values of color components in a second gamut that are mapped to the values of the color components in the first gamut that are mapped to the vertex. The values of the color components in the second gamut can be stored in a fixed point format or a floating-point format.

The values of the color components associated with the vertices are stored in four memories such as the memories 741-744 shown in FIG. 7. Each value of the color components associated with the vertex are assigned to one of the memories based on its location in the 3-D LUT 800. In the illustrated embodiment, values of color components associated with the vertices are assigned to memories in a sequence beginning at the lowest values of $R_{in}$, $G_{in}$, $B_{in}$. The sequence increments along the Red axis with fixed values of Green and Blue. For example, the vertex at the lowest, leftmost position is assigned to the memory 0, the vertex having the next higher value in Red is assigned to the memory 1, the vertex having the next higher value in Red is assigned to the memory 2, the vertex having the next higher value in Red is assigned to the memory 3, and the vertex having the next higher value in Red is assigned to the memory 0. The sequence repeats until the end of the Red axis and then loops back to the next higher value in Green and returns to the lowest value in Red. This vertex is assigned to the memory 1. The vertex having the next higher value in Red is assigned to the memory 2 and the sequence repeats until all the vertices at the lowest value in Blue have been assigned to a memory. The sequence then moves to the next higher value in Blue and returns to the lowest values of Red and Green. Assigning the values to the memories according to this sequence allows the vertices of a tetrahedron used for interpolation to be accessed concurrently.

Figure 9:
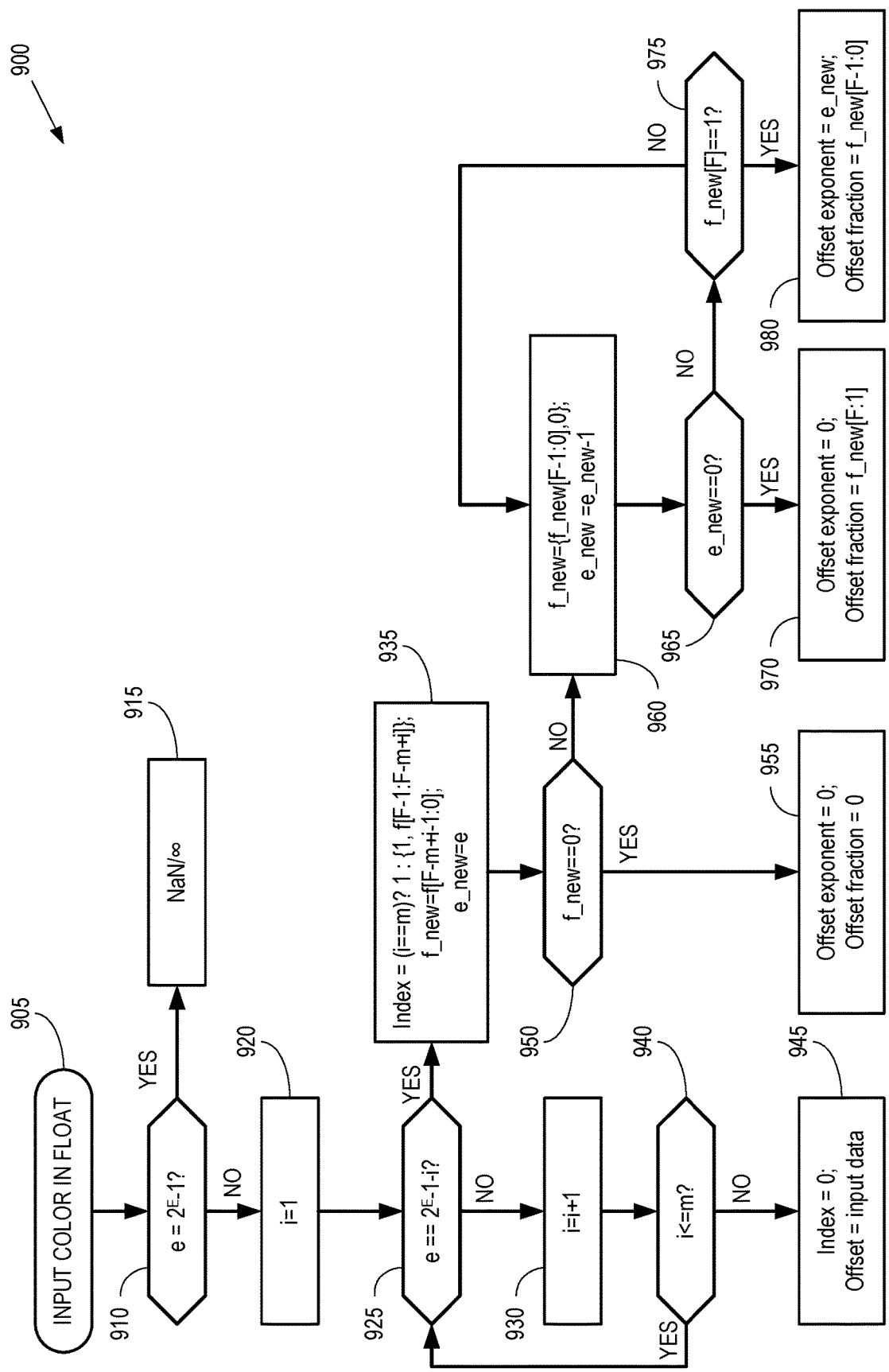
FIG. 9 is a flow diagram of a method for generating indices and offsets from a floating point representation of color component values of an input color in a source gamut according to some embodiments.

FIG. 9 is a flow diagram of a method 900 for generating indices and offsets from a floating point representation of color component values of an input color in a source gamut according to some embodiments. The method 900 is implemented in some embodiments of the floating-point gamut mapper 115 shown in FIG. 1 or the data segmenter 704 shown in FIG. 7. In the illustrated embodiment, a data segmenter is configured to receive color component values of an input color that are encoded in a floating-point format that represents each color component value with a sign bit (s), a set of exponent bits (e), and a set of fraction bits (f). For example, the floating-point format can include a number (S) of sign bits, a number (E) of exponent bits, and a number (F) of fraction bits. The indices and offsets are used to identify locations in a 3-D LUT that associates component color values in a destination gamut to the vertices of the 3-D LUT. A predetermined number of samples are distributed uniformly along each axis of the 3-D LUT and a number (m) of bits are used to identify the samples along three axes of the 3-D LUT.

At terminator block 905, the data segmenter receives the floating-point values representative of the color components of the input color in the source gamut. At decision block 910, the data segmenter determines whether the exponent value (e) indicates that the floating-point value is not-a-number (NaN) or has a value equal to infinity (∞). In some embodiments, the NaN and ∞ are indicated by an exponent value of $2^E-1$, as discussed herein. If so, the method 900 ends for the out of bounds color component value at block 915. If not, and the color component value is represented by an inbounds floating-point value, the method 900 flows to block 920.

At block 920, the data segmenter sets a value of a counter (i) to one. At decision block 925, the data segmenter determines whether the exponent value is equal to $2^E-1-i$. If not, the method 900 flows to block 930. If the exponent value is equal to 2E−1−i, the method 900 flows to block 935.

At block 930, the value of the counter (i) is incremented by one. At decision block 940, the data segmenter determines whether the value of the counter (i) is less than or equal to the value of the number (m) of bits that are used to identify the samples along three axes of the 3-D LUT. If so, the method 900 flows back to decision block 925. If not, the method 900 flows to block 945. At block 945, the value of the index is set to zero (i.e., a value associated with the sample at the origin of the corresponding axis of the 3-D LUT) and the offset is set equal to the floating-point value of the color component of the input color. In this situation, the floating-point value of the color component is no less than zero but less than the fixed point value corresponding to the sample at m=1 on the corresponding axis of the 3-D LUT.

At block 935, the data segmenter generates a value of the index. For example, the value of the index is determined based on whether the current value of the counter (i) equal to the value of the number (m) of bits that are used to identify the samples along three axes of the 3-D LUT. If so, the value of the index is set equal to one. If not, the value of the MSB of the index is set equal to one and the less significant bits of the index are set equal to a set of bits that includes the bits from the most significant (F−1) bit of the fractional value to the (F−m+i) bit of the fractional value. The fractional values include F bits, starting from 0 and excluding the implicit bit. The index is also left padded with zero value bits so that the number of bits that represent the index is equal to the number (m). At block 935, the data segmenter also generates modified values of the exponent value (e_new) and the fractional value (f_new) of the floating-point value of the color component. For example, the modified fractional value is determined by the less significant bits that are not included in the value of the index, e.g., by setting the values of the bits that were used to determine the index to zero. The modified exponent value is set equal to the current exponent value. The method 900 then flows to decision block 950.

At decision block 950, the data segmenter determines whether the modified fractional value is equal to zero. If so, the method 900 flows to block 955. At block 955, exponent bits of the offset are set equal to zero and bits representing a fractional value of the offset are also set equal to zero. If not, the method 900 flows to block 960.

At block 960, the data segmenter left-shifts the bits in the modified fractional value by one bit and decrements the modified exponent value by one. The method 900 flows to decision block 965. At decision block 965, the data segmenter determines whether the modified exponent value is equal to zero. If so, the method 900 flows to block 970 and the offset exponent bit is set to zero and the offset fraction bit is set to the modified fractional value (f_new[F:1]). If the modified exponent value is not equal to zero, the method 900 flows to decision block 975.

At decision block 975, the data segmenter determines whether the implicit bit (F bit) of the modified fractional value is equal to one. If not, the method 900 flows back to block 960. If so, the method 900 flows to block 980. At block 980, the data segmenter sets the bits representative of the exponent of the offset equal to the modified exponent value. The data segmenter also drops the MSB of the modified fractional value and sets the bits representative of the fractional value of the offset equal to the remaining bits in the modified fractional value (f_new[F−1:0]). Overall, the index is obtained in either block 935 or 945 and the offset is obtained in block 945, 955, 970, or 980.

Figure 10:
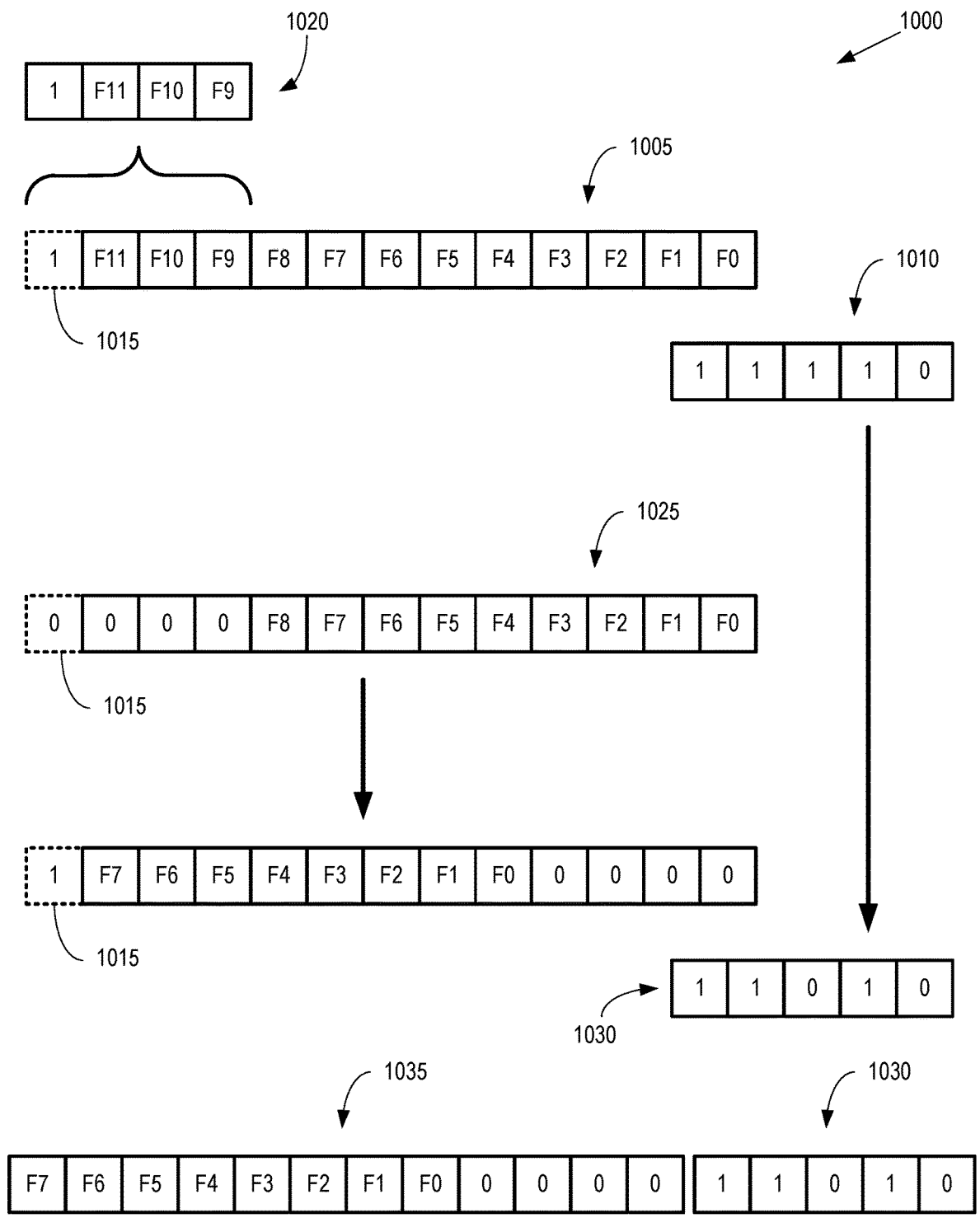
FIG. 10 is a diagram that illustrates a first set of fractional values and exponent values associated with a floating-point representation of a color component value of an input color according to some embodiments.

FIG. 10 is a diagram that illustrates a first set 1000 of fractional values and exponent values associated with a normalized floating-point representation of a color component value of an input color according to some embodiments. The set 1000 is generated by some embodiments of the method 900 shown in FIG. 9. In the illustrated embodiment, the floating-point representation of the color component value is represented by one (S=1) sign bit, five (E=5) exponent bits, and twelve (F=12) of fraction bits. The initial fractional value 1005 is a value represented by the bit values F11:F0 and the initial exponent value 1010 is 30, which is represented by the bit values 11110. In the illustrated embodiment, the bit 1015 is an implicit bit, i.e., the value of the bit 1015 is assumed to be one and so it does not need to be stored in a register or memory element, as indicated by the dashed box. In the following discussion, the implicit bit 1015 is considered to be the MSB of the fractional value 1005.

In the illustrated embodiment, the 3-D LUT is constructed so that the number of samples along each axis is equal to $2^4-1=17$ and the location of each sample can therefore be indicated by a number (m) of bits that is equal to four. The exponent value 1010 is equal to thirty, which is equal to $2^5-1-1$. Thus, the value of the index 1020 is determined by selecting the four most significant bits of the fractional value 1005. For example, the value of the index 1020 can be determined according to decision block 925 and block 935 in FIG. 9. The value of the index 1020 is therefore equal to $1F_{11}F_{10}F_9$.

The four most significant bits of the fractional value 1005 are then set to zero to generate the modified fractional value 1025. In the illustrated embodiment, the value $F_8=1$. The modified fractional value 1025 is left shifted until the most significant bit (i.e., the implicit bit 1015) is equal to one. This requires four left shifts in order to shift the value $F_8=1$ into the position of the implicit bit 1015. For each left shift of the modified fractional value 1025, the exponent value 1010 is decremented by one to generate a modified exponent value 1030. In the illustrated embodiment, the exponent value 1010 is decremented four times from a value of thirty to a modified exponent value 1030 that is equal to twentysix, e.g., the modified exponent value 1030 is represented by the bits 11010. The offset is then represented in normalized floating-point format by the modified fractional value 1035 (with an implicit bit of one) and the modified exponent value 1030.

Figure 11:
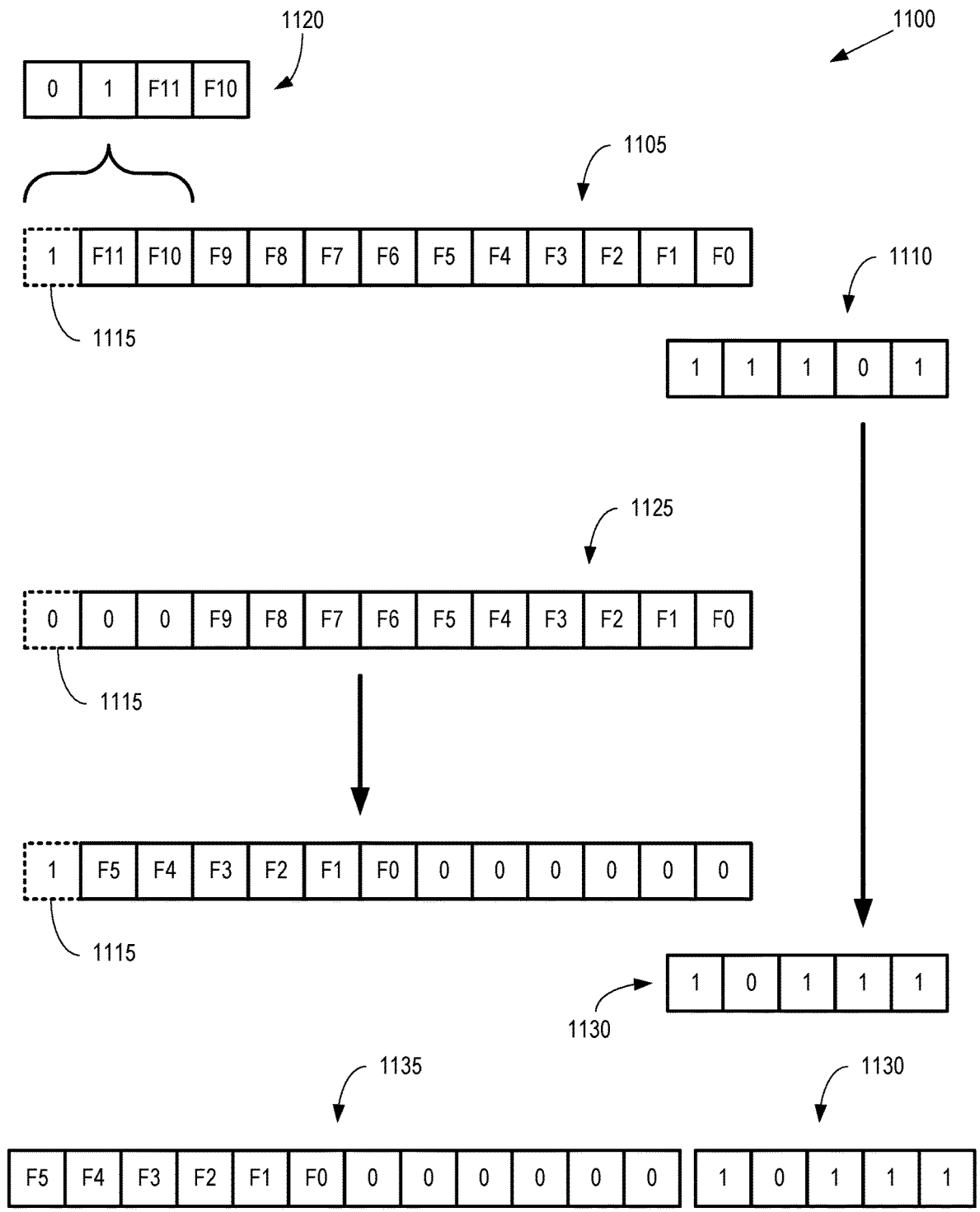
FIG. 11 is a diagram that illustrates a second set of fractional values and exponent values associated with a floating-point representation of a color component value of an input color according to some embodiments.

FIG. 11 is a diagram that illustrates a second set 1100 of fractional values and exponent values associated with a floating-point representation of a color component value of an input color according to some embodiments. The set 1100 is generated by some embodiments of the method 900 shown in FIG. 9. In the illustrated embodiment, the floating-point representation of the color component value is represented by one (S=1) sign bit, five (E=5) exponent bits, and 12 (F=12) of fraction bits. The initial fractional value 1105 is a value represented by the bit values F11:F0 and the initial exponent value 1010 is twenty-nine, which is represented by the bit values 11101. In the illustrated embodiment, the bit 1115 is an implicit bit, i.e., the value of the bit 1115 is assumed to be one and so it does not need to be stored in a register or memory element, as indicated by the dashed box. In the following discussion, the implicit bit 1115 is considered to be the most significant bit of the fractional value 1105.

In the illustrated embodiment, the 3-D LUT is constructed so that the number of samples along each axis is equal to $2^4-1=17$ and the location of each sample can therefore be indicated by a number (m) of bits that is equal to four. The exponent value 1010 is equal to twenty-nine, which is equal to $2^5-1-2$. Thus, the value of the index 1120 is determined by selecting the three most significant bits of the fractional value 1105 and then padding the index 1120 with a leading zero. For example, the value of the index 1120 can be determined according to decision block 925 and block 935 in FIG. 9. The value of the index 1020 is therefore equal to $01F_{11}F_{10}$.

The three most significant bits of the fractional value 1105 are then set to zero to generate the modified fractional value 1125. In the illustrated embodiment, the values $F_9=0$, $F_8=0$, $F_7=0$, and $F_6=1$. The modified fractional value 1125 is left shifted until the most significant bit (i.e., the implicit bit 1115) is equal to one. This requires six left shifts in order to shift the value $F_6=1$ into the position of the implicit bit 1115. For each left shift of the modified fractional value 1125, the exponent value 1110 is decremented by one to generate a modified exponent value 1130. In the illustrated embodiment, the exponent value 1110 is decremented six times from a value of twenty-nine to a modified exponent value 1130 that is equal to twenty-three, e.g., the modified exponent value 1130 is represented by the bits 10111. The offset is then represented in floating-point format by the modified fractional value 1135 (with an implicit bit of one) and the modified exponent value 1130.

Figure 12:
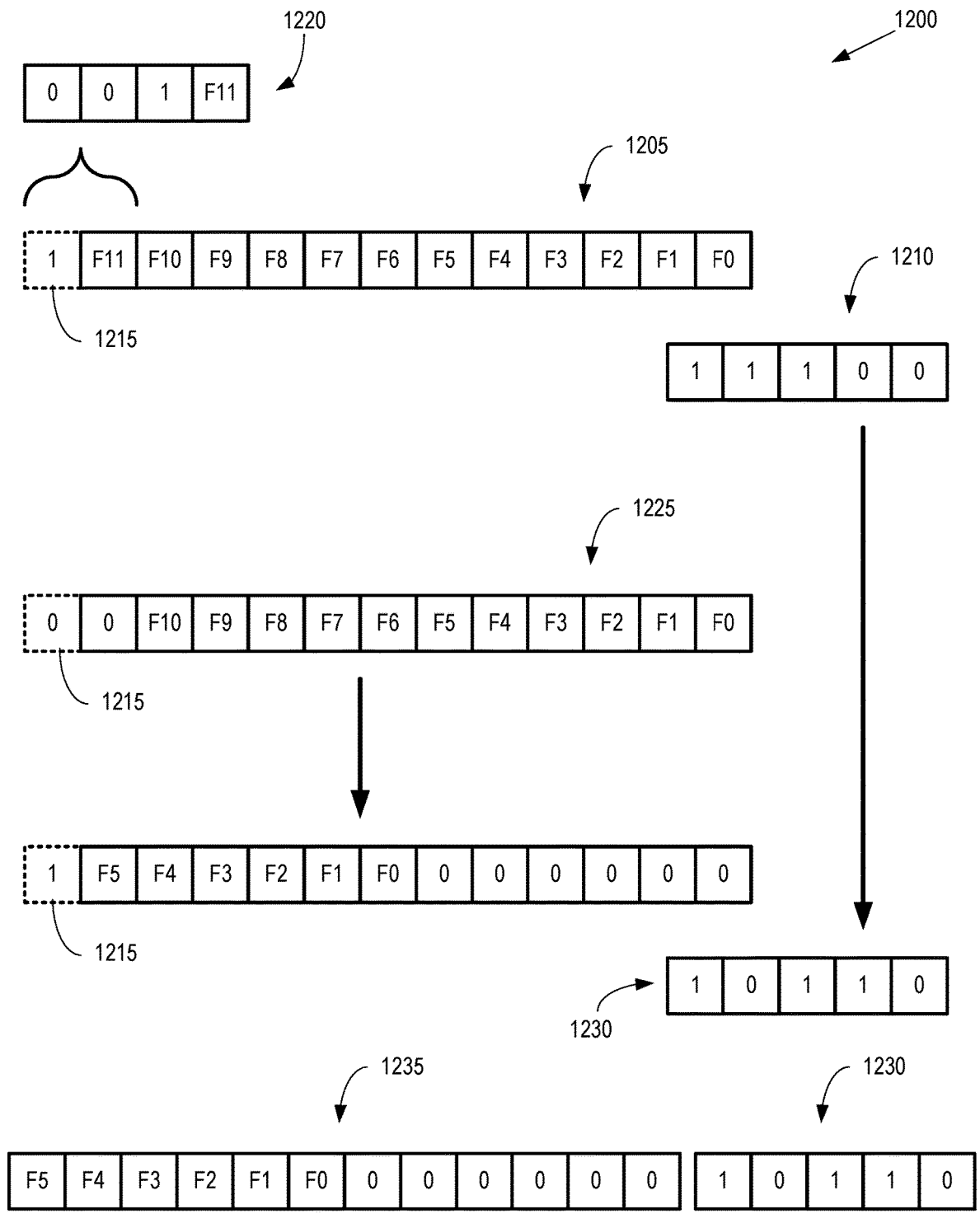
FIG. 12 is a diagram that illustrates a third set of fractional values and exponent values associated with a floating-point representation of a color component value of an input color according to some embodiments.

FIG. 12 is a diagram that illustrates a third set 1200 of fractional values and exponent values associated with a floating-point representation of a color component value of an input color according to some embodiments. The set 1200 is generated by some embodiments of the method 900 shown in FIG. 9. In the illustrated embodiment, the floating-point representation of the color component value is represented by one (S=1) sign bit, five (E=5) exponent bits, and 12 (F=12) of fraction bits. The initial fractional value 1205 is a value represented by the bit values F11:F0 and the initial exponent value 1210 is twenty-eight, which is represented by the bit values 11100. In the illustrated embodiment, the bit 1215 is an implicit bit, i.e., the value of the bit 1215 is assumed to be one and so it does not need to be stored in a register or memory element, as indicated by the dashed box. In the following discussion, the implicit bit 1215 is considered to be the most significant bit of the fractional value 1205.

In the illustrated embodiment, the 3-D LUT is constructed so that the number of samples along each axis is equal to $2^4-1=17$ and the location of each sample can therefore be indicated by a number (m) of bits that is equal to four. The exponent value 1010 is equal to twenty-eight, which is equal to $2^5-1-3$. Thus, the value of the index 1220 is determined by selecting the two most significant bits of the fractional value 1205 and then padding the index 1220 with two leading zeros. For example, the value of the index 1220 can be determined according to decision block 925 and block 935 in FIG. 9. The value of the index 1220 is therefore equal to $001F_{11}$.

The two most significant bits of the fractional value 1205 are then set to zero to generate the modified fractional value 1225. In the illustrated embodiment, the values $F_{10}=0$, $F_9=0$, $F_8=0$, $F_7=0$, and $F_6=1$. The modified fractional value 1225 is left shifted until the most significant bit (i.e., the implicit bit 1215) is equal to one. This requires six left shifts in order to shift the value $F_6=1$ into the position of the implicit bit 1215. For each left shift of the modified fractional value 1225, the exponent value 1210 is decremented by one to generate a modified exponent value 1230. In the illustrated embodiment, the exponent value 1210 is decremented six times from a value of twenty-eight to a modified exponent value 1230 that is equal to twenty-two, e.g., the modified exponent value 1230 is represented by the bits 10110. The offset is then represented in floating-point format by the modified fractional value 1235 (with an implicit bit of one) and the modified exponent value 1230.

Figure 13:
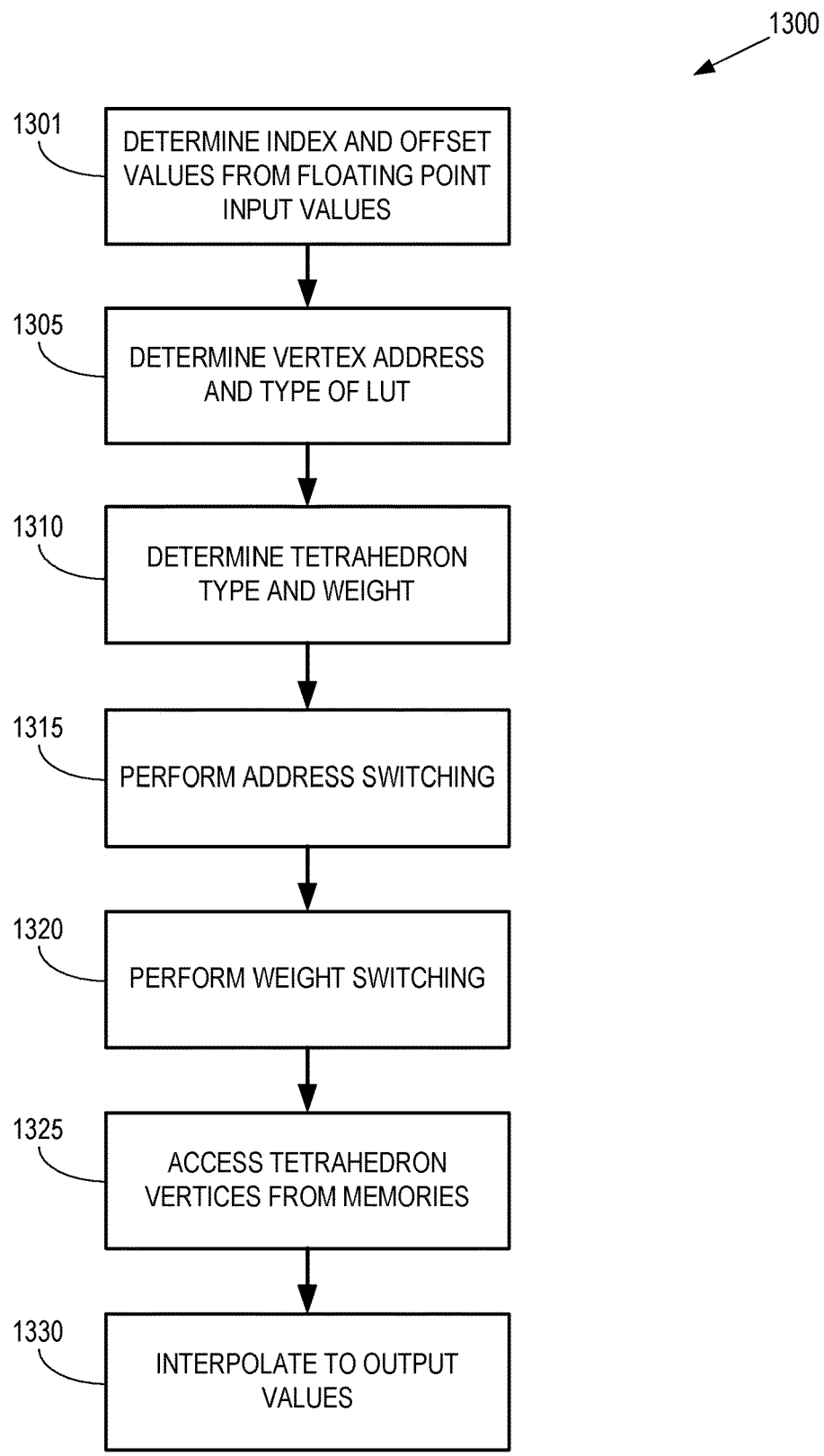
FIG. 13 is a flow diagram of a method of performing tetrahedral interpolation using floating-point representations of color component values of an input color to address vertices of a 3-D LUT according to some embodiments.

FIG. 13 is a flow diagram of a method 1300 of performing tetrahedral interpolation using floating-point representations of color component values of an input color to address vertices of a 3-D LUT according to some embodiments. The method 1300 is implemented in some embodiments of the floating-point gamut mapper 115 shown in FIG. 1 and the 3-D LUT 700 shown in FIG. 7.

At block 1301, a data segmenter receives color component values of an input color in a floating-point format and determines corresponding indices and offsets for each of the color component values. For example, the data segmenter can determine the indices and offsets for each of the color component values using some embodiments of the method 900 shown in FIG. 9. Consequently, the data segmenter can be implemented using only a fixed point adder or left shifter. In the illustrated embodiment, the color component values are RGB component values that represent the input color in a first, or source, gamut. Thus, the data segmenter generates indices and offsets for each of the RGB component values. The indices and offsets can therefore be referred to as the RGB indices and the RGB offsets, respectively. In the following discussion, the RGB indices are referred to as R, G, and B, respectively, and the RGB offsets are referred to as r, g, and b, respectively.

At block 1305, an address decoder such as the address decoder 705 shown in FIG. 7 determines a vertex address of a vertex in the 3-D LUT and a type of LUT based on the RGB indices provided by the data segmenter. The number of bits in each of the RGB indices is equal to a number (m) of bits that is needed to represent the samples along each axis of the 3-D LUT. The address decoder also uses the address of the vertex to identify one or more neighboring vertices in the 3-D LUT. Some embodiments of the address decoder determine the vertex addresses by determining a value of a counter based on the RGB indices:

$$\text{Counter}=(2^m+1)(2^m+1)B+(2^m+1)G+R$$

The value of the counter can also be expressed as:

Counter=$(2^{2m}+2^{m+1}+1)B+(2^m+1)G+R$

A remainder of the counter after division by four is computed:

$L=\text{rem}(\text{Counter}/4)$

Figure 14:
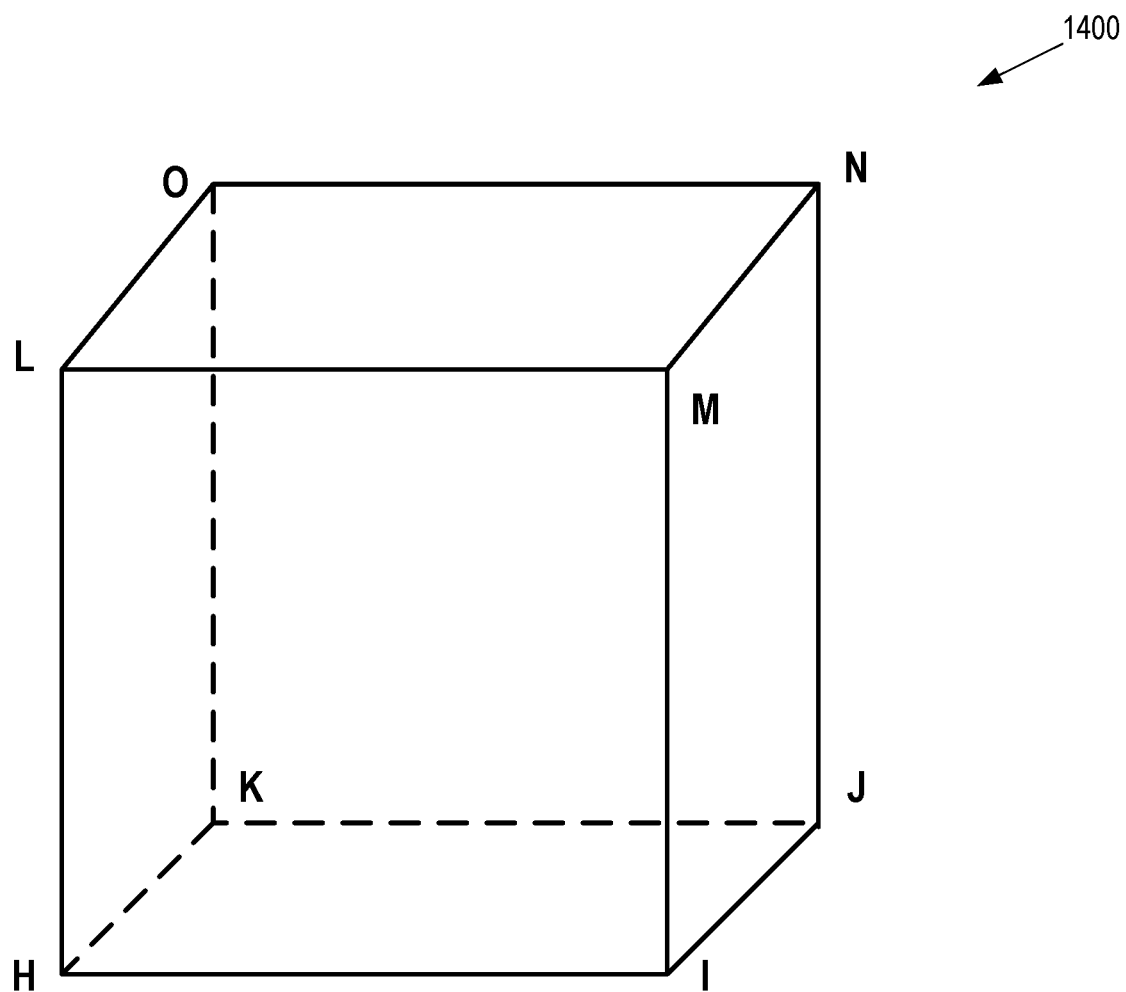
FIG. 14 illustrates a cube that encompasses a location of an input color in the 3-D LUT according to some embodiments.

The vertex addresses of a cube that encompasses the location of the input color are determined based on the counter. The vertices are identified by the letters H, I, J, K, L, M, N, O, as indicated in FIG. 14, which illustrates a cube 1400 that encompasses the location of an input color in the 3-D LUT according to some embodiments. For example, the cube 1400 can represent some embodiments of the cube 305 that encompasses the location 315 shown in FIG. 3. The vertex addresses are computed as follows:

$$\begin{cases} H = A_B \\ I = A_B + \alpha \\ J = A_B + 2^{m-2} + \beta \\ K = A_B + 2^{m-2} + \alpha \\ L = A_B + 2^{2m-2} + 2^{m-1} + \alpha \\ M = A_B + 2^{2m-2} + 2^{m-1} + \beta \\ N = A_B + 2^{2m-2} + 2^{m-1} + 2^{m-2} + \gamma \\ O = A_B + 2^{2m-2} + 2^{m-1} + 2^{m-2} + \beta \end{cases}$$

where $$\alpha = \begin{cases} 1 & L == 3 \\ 0 & \text{otherwise} \end{cases}, \beta = \begin{cases} 1 & L >= 2 \\ 0 & \text{otherwise} \end{cases}, \gamma = \begin{cases} 1 & L >= 1 \\ 0 & \text{otherwise} \end{cases},$$

$A_B$=floor(counter/4), and floor rounds the element in the bracket to the nearest integer towards zero.

Figure 15:
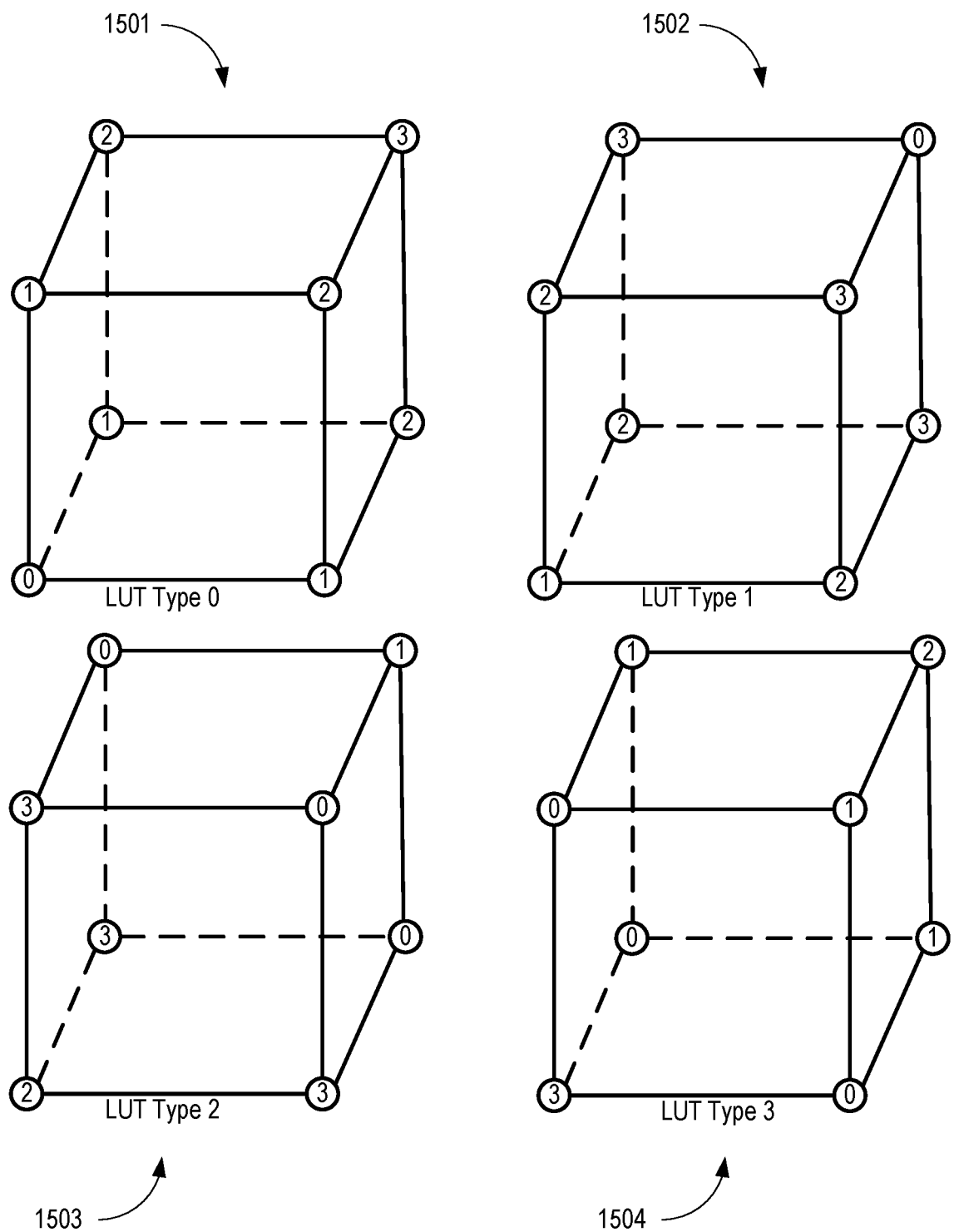
FIG. 15 is a diagram that illustrates a set of LUT types for a set of cubes in a lattice that represent the 3-D LUT according to some embodiments.

The LUT type of the cube that encompasses the input color in the 3-D LUT is determined based on the memories that are used to store the component values associated with the vertices of the cube. FIG. 15 is a diagram that illustrates a set of LUT types for a set of cubes 1501, 1502, 1503, 1504 in a lattice that represent the 3-D LUT according to some embodiments. The numbers (0, 1, 2, 3) in the circles at the vertices of the cubes indicate the four memory elements that are used to store component values and evaluate each of the vertices is stored in the memory element indicated by the corresponding number. For example, the number 0 indicates that the corresponding component value is stored in a first memory such as the memory 741 shown in FIG. 7, the number 1 indicates that the corresponding component value is stored in a second memory such as the memory 742 shown in FIG. 7, the number 2 indicates that the corresponding component value is stored in a third memory such as the memory 743 shown in FIG. 7, and the number 3 indicates that the corresponding component value is stored in a first memory such as the memory 744 shown in FIG. 7. In some embodiments, the component values are stored in the four memories according to the sequence illustrated in FIG. 8.

The different LUT types 0, 1, 2, 3 correspond to different associations of the vertices of the cubes 1501-1504 to the four memories 0, 1, 2, 3. The following table indicates the memories associated with each vertex in the cubes for each LUT type.

| lut_type | H | I | J | K | L | M | N | O |
|---|---|---|---|---|---|---|---|---|
| 0 | 0 | 1 | 2 | 1 | 1 | 2 | 3 | 2 |
| 1 | 1 | 2 | 3 | 2 | 2 | 3 | 0 | 3 |
| 2 | 2 | 3 | 0 | 3 | 3 | 0 | 1 | 0 |
| 3 | 3 | 0 | 1 | 0 | 0 | 1 | 2 | 1 |

In some embodiments, the LUT type of the cubes 1501-1504 can be determined from the RGB indices associated with the input color using:

lut_type=rem($(B+G+R)/4$), which is a remainder of (B+G+R) after division by 4.

At block 1310, a module such as the module 710 shown in FIG. 7 determines a type of the tetrahedron used for the interpolation and weights associated with the vertices of the tetrahedron. There are six types of tetrahedron corresponding to the six tetrahedrons 501-506 shown in FIG. 5. The module determines the type of the tetrahedron using the RGB offsets (r, g, b) of the input color:

T0: g>=b>r
T1: b>r>g
T2: b>g>=r
T3: r>=g>b
T4: g>r>=b
T5: r>=b>=g.

The weights ($w_A$, $w_B$, $w_C$, $W_D$) are determined based on the RGB offsets (r, g, b) of the input color and the length Δ of one side of the cube:

$\Delta = 2^{(n-m)}$ where it is assumed that the used floating point format can represent a value with range between positive and negative $2^n$.

The details of the weights calculation should use the following table:

| tetrahedron | $w_A$ | $w_B$ | $w_C$ | $w_D$ |
|---|---|---|---|---|
| T0 | Δ-g | g-b | b-r | r |
| T1 | Δ-b | b-r | r-g | g |
| T2 | Δ-b | b-g | g-r | r |
| T3 | Δ-r | r-g | g-b | b |
| T4 | Δ-g | g-r | r-b | b |
| T5 | Δ-r | r-b | b-g | g |

At block 1315, a module such as the address switch 735 shown in FIG. 7 performs address switching to identify four vertices for the selected tetrahedron from the eight vertices of the cube based on the type of tetrahedron using the following table:

| tetrahedron | Addr_A | Addr_B | Addr_C | Addr_D |
|---|---|---|---|---|
| T0 | H | K | O | N |
| T1 | H | L | M | N |
| T2 | H | L | O | N |
| T3 | H | I | J | N |
| T4 | H | K | J | N |
| T5 | H | I | M | N |

In some embodiments, the multiplexer 717 selects from vertex K, I, or L and the multiplexer 718 selects from vertex M, O, or J. The addresses are then switched based on the LUT type of the cube (lut_type) using the following table:

| lut_type | Addr0 | Addr1 | Addr2 | Addr3 |
|---|---|---|---|---|
| 0 | Addr_A | Addr_B | Addr_C | Addr_D |
| 1 | Addr_D | Addr_A | Addr_B | Addr_C |
| 2 | Addr_C | Addr_D | Addr_A | Addr_B |
| 3 | Addr_B | Addr_C | Addr_D | Addr_A |

At block 1320, a module such as the weight switch 740 shown in FIG. 7 performs weight switching so that the weights match the switched addresses using the following table:

| Lut_type | w0 | w1 | w2 | w3 |
|---|---|---|---|---|
| 0 | $w_A$ | $w_B$ | $w_C$ | $w_D$ |
| 1 | $w_D$ | $w_A$ | $w_B$ | $w_C$ |
| 2 | $w_C$ | $w_D$ | $w_A$ | $w_B$ |
| 3 | $w_B$ | $w_C$ | $w_D$ | $w_A$ |

At block 1325, the values of the component colors associated with the tetrahedron vertices are accessed concurrently from the set of memories using the addresses.

At block 1330, an interpolator such as the tetrahedral interpolator 745 shown in FIG. 7 uses the values of the component colors associated with the tetrahedron vertices to interpolate to the output values from a location of the input color in the 3-D LUT. For example, the mapping outputs $o_0$, $o_1$, $o_2$, $o_3$ for each of the four vertices can be interpolated to the location of the input color. Each mapping output includes three color components such as Red, Green, and Blue color components in the second gamut. The interpolation output is determined based on the component values and the weights according to:

$$\begin{cases} R_{out} = (w_0 \times O_{R0} + w_1 \times O_{R1} + w_2 \times O_{R2} + w_3 \times O_{R3})/\Delta \\ G_{out} = (w_0 \times O_{G0} + w_1 \times O_{G1} + w_2 \times O_{G2} + w_3 \times O_{G3})/\Delta \\ B_{out} = (w_0 \times O_{B0} + w_1 \times O_{B1} + w_2 \times O_{B2} + w_3 \times O_{B3})/\Delta \end{cases}$$

In some embodiments, the apparatus and techniques described above are implemented in a system comprising one or more integrated circuit (IC) devices (also referred to as integrated circuit packages or microchips), such as the floating-point gamut mapper described above with reference to FIGS. 1-15. Electronic design automation (EDA) and computer aided design (CAD) software tools may be used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   determining, at a data segmenter of an electronic device, indices based on fractional values of floating-point representations of component values of an input color that are selected based on exponent values of the floating-point representations, wherein the component values are defined according to a source gamut;
   determining, at the data segmenter, offsets associated with the indices using subsets of the fractional values; and
   mapping the input color to an output color defined according to a destination gamut based on the indices and offsets.

2. The method of claim 1, wherein determining the indices comprises padding values of the fractional values so that the indices include a number of bits that is equal to a number (m) of bits that are used to identify vertices along three axes of a three-dimensional (3-D) lookup table (LUT).

3. The method of claim 2, wherein mapping the input color to the output color comprises identifying samples along the three axes of the 3-D LUT using the padded values, wherein the identified samples define a vertex of a cube that encompasses a location of the input color in the 3-D LUT.

4. The method of claim 3, wherein determining the offsets comprises:
   determining modified fractional values by setting values of a selected number of most significant bits (MSBs) of the fractional values to zero;
   left shifting the modified fractional values until the MSB in the fractional value is equal to 1; and
   decreasing the exponent values by one for each left shift of the bits in the fractional value.

5. The method of claim 4, wherein mapping the input color to the output color comprises identifying additional vertices of the cube based on the offsets.

6. The method of claim 5, wherein mapping the input color to the output color comprises retrieving component values representative of second colors determined by the destination gamut, wherein the component values are stored at memory locations associated with the identified vertices.

7. The method of claim 6, wherein retrieving the component values from the memory locations comprises concurrently retrieving the component values from a plurality of memories.

8. The method of claim 6, wherein mapping the input color to the output color comprises interpolating the retrieved component values to the location of the input color in the 3-D LUT using the offsets.

9. An apparatus comprising:
   a data segmenter configured to:
      determine indices based on fractional values of floating-point representations of component values of an input color that are selected based on exponent values of the floating-point representations, wherein the component values are defined according to a source gamut, and
      determine offsets associated with the indices using subsets of the fractional values; and
   an interpolator configured to map the input color to an output color defined according to a destination gamut based on the indices and offsets.

10. The apparatus of claim 9, wherein the data segmenter is configured to pad values of the fractional values so that the indices include a number of bits that is equal to a number (m) of bits that are used to identify vertices along three axes of a three-dimensional (3-D) lookup table (LUT).

11. The apparatus of claim 10, further comprising:
   an address decoder configured to identify samples along the three axes of the 3-D LUT using the padded indices, wherein the identified samples define a vertex of a cube that encompasses a location of the input color in the 3-D LUT.

12. The apparatus of claim 11, wherein the data segmenter is configured to:
   determine modified fractional values by setting values of a selected number of most significant bits (MSBs) of the fractional values to zero;
   left shift the modified fractional values until the MSB in the fractional value is equal to 1; and
   decrease the exponent values by one for each left shift of the bits in the fractional value.

13. The apparatus of claim 12, wherein the address decoder is configured to identify additional vertices of the cube based on the offsets.

14. The apparatus of claim 13, further comprising:
   a plurality of memory elements configured to store component values representative of second colors determined by the destination gamut, wherein the component values are stored at memory locations associated with the identified vertices.

15. The apparatus of claim 14, wherein the interpolator is configured to concurrently retrieve the component values representative of the second colors from the plurality of memory elements.

16. The apparatus of claim 14, wherein the interpolator is configured to interpolate the retrieved component values to the location of the input color in the 3-D LUT using the offsets.

17. A method, comprising:
   converting, at a data segmenter of an electronic device, floating-point representations of component values of an input color to fixed point representations of indices of the component values of the input color and corresponding offsets, wherein the component values are defined according to a source gamut;
   identifying, at an address decoder, vertices in a three-dimensional (3-D) look up table (LUT) that encompass a location in the 3-D LUT indicated by the fixed point representation of the indices and the corresponding offsets; and
   mapping, at an interpolator, the input color to an output color defined according to a destination gamut based on the location in the 3-D LUT.

18. The method of claim 17, wherein converting the floating-point representations to the fixed point representations of the indices and the corresponding offsets comprises:
   selecting numbers of most significant bits (MSBs) of fractional values of the floating-point representations based on exponent values of the floating-point representations;
   determining indices based on the selected number of MSBs of the fractional values; and
   determining offsets associated with the indices using subsets of the fractional values.

19. The method of claim 18, wherein determining the corresponding offsets comprises:
   determining modified fractional values by setting values of the selected number of MSBs of the fractional values to zero;

left shifting the modified fractional values until the MSB in the fractional value is equal to 1; and decreasing the exponent values by one for each left shift of the bits in the fractional value.

20. The method of claim 18, wherein mapping the input color to the output color comprises concurrently retrieving component values representative of second colors determined by the destination gamut from a plurality of memory locations associated with the identified vertices and interpolating the retrieved component values to the location of the input color in the 3-D LUT using the corresponding offsets.

* * * * *